United States Patent
Kobayashi

(10) Patent No.: US 11,393,431 B2
(45) Date of Patent: Jul. 19, 2022

(54) DISPLAY SYSTEM, CONTROL PROGRAM FOR INFORMATION PROCESSOR, AND CONTROL METHOD FOR INFORMATION PROCESSOR THAT ARE CONFIGURED TO ADJUST DISPLAY OF A FIRST IMAGE ON A FIRST DISPLAY UNIT BASED ON THE POSITION OF A SECOND DISPLAY UNIT

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/795,829

(22) Filed: Feb. 20, 2020

(65) Prior Publication Data
US 2020/0273432 A1   Aug. 27, 2020

(30) Foreign Application Priority Data

Feb. 21, 2019 (JP) .............................. JP2019-029701

(51) Int. Cl.
| | | |
|---|---|---|
| G09G 5/37 | (2006.01) | |
| G09G 5/38 | (2006.01) | |
| G02B 27/01 | (2006.01) | |

(52) U.S. Cl.
CPC ........... *G09G 5/37* (2013.01); *G02B 27/0172* (2013.01); *G02B 27/0179* (2013.01); *G09G 5/38* (2013.01);
(Continued)

(58) Field of Classification Search
CPC .... G09G 5/37; G09G 5/38; G09G 2340/0464; G09G 2354/00; G02B 27/0172;
(Continued)

(56) References Cited

U.S. PATENT DOCUMENTS

| | | | | |
|---|---|---|---|---|
| 2012/0127284 A1* | 5/2012 | Bar-Zeev | .............. | G06T 19/006 348/53 |
| 2012/0242560 A1* | 9/2012 | Nakada | ................ | G09G 3/3406 345/8 |

(Continued)

FOREIGN PATENT DOCUMENTS

| | | |
|---|---|---|
| CN | 102540464 A | 7/2012 |
| CN | 108508599 A | 9/2018 |
| JP | 2015-197694 A | 11/2015 |

*Primary Examiner* — Temesghen Ghebretinsae
*Assistant Examiner* — Ivelisse Martinez Quiles
(74) *Attorney, Agent, or Firm* — Oliff PLC

(57) ABSTRACT

It is provided that a display system including a HMD and a smartphone connected to the HMD, wherein the HMD configured to visually recognize an external scene and display a first image overlapping the external scene, the smartphone includes a display panel configured to display a second image, a touch sensor arranged at the display panel, a first determination unit configured to determine whether the display panel is facing the HMD, a detection unit configured to detect a position of the display panel with respect to the HMD, a second determination unit configured to determine whether the position of the display panel is included in the first image, and an adjustment unit configured to adjust display of the first image on an image display (Continued)

unit based on a determination result of the first determination unit and a determination result of the second determination unit.

15 Claims, 11 Drawing Sheets

(52) U.S. Cl.
CPC ............... *G02B 2027/014* (2013.01); *G02B 2027/0138* (2013.01); *G02B 2027/0187* (2013.01); *G09G 2340/0464* (2013.01); *G09G 2354/00* (2013.01)

(58) Field of Classification Search
CPC ........ G02B 27/0179; G02B 2027/0187; G02B 2027/014; G02B 2027/0138; G02B 27/0093; G02B 27/017; G06F 3/011; G06F 3/1423; G06F 3/1454; G06F 3/0346; G06F 1/163; G06F 2203/012; G06F 2203/04804; G06F 3/013; G06F 3/04817; G06K 9/00; H04M 1/72555; H04M 1/72533; H04M 1/7253; H04M 2250/12; H04M 1/72412; H04M 1/72415; H04M 1/72439; G06V 20/20; G06V 40/18

See application file for complete search history.

(56) References Cited

U.S. PATENT DOCUMENTS

| | | | |
|---|---|---|---|
| 2015/0177825 A1* | 6/2015 | Reponen | G06F 3/005 345/156 |
| 2015/0234456 A1* | 8/2015 | Cho | G06F 3/013 345/156 |
| 2015/0348322 A1* | 12/2015 | Ligameri | G06F 3/013 345/633 |
| 2016/0292922 A1* | 10/2016 | Kasahara | G06F 1/1647 |
| 2017/0061692 A1* | 3/2017 | Giraldi | G06T 19/006 |
| 2017/0206673 A1* | 7/2017 | Kawamoto | G06F 1/163 |
| 2017/0249726 A1* | 8/2017 | Rochford | G06F 1/163 |
| 2017/0263056 A1* | 9/2017 | Leppanen | G06T 19/006 |
| 2017/0308258 A1* | 10/2017 | Xu | G02B 27/0172 |
| 2018/0164589 A1* | 6/2018 | Watanabe | G02B 27/0101 |
| 2018/0249086 A1 | 8/2018 | Ozawa et al. | |
| 2018/0366091 A1* | 12/2018 | Han | G06F 3/017 |
| 2020/0007773 A1 | 1/2020 | Ozawa et al. | |
| 2020/0344420 A1 | 10/2020 | Ozawa et al. | |
| 2021/0255461 A1* | 8/2021 | Watanabe | G06F 3/048 |

* cited by examiner

DISPLAY SYSTEM, CONTROL PROGRAM FOR INFORMATION PROCESSOR, AND CONTROL METHOD FOR INFORMATION PROCESSOR THAT ARE CONFIGURED TO ADJUST DISPLAY OF A FIRST IMAGE ON A FIRST DISPLAY UNIT BASED ON THE POSITION OF A SECOND DISPLAY UNIT

The present application is based on, and claims priority from JP Application Serial Number 2019-029701, filed Feb. 21, 2019, the disclosure of which is hereby incorporated by reference herein in its entirety.

BACKGROUND

1. Technical Field

The present disclosure relates to a display system, a control program for an information processor, and a control method for the information processor.

2. Related Art

It is known that an image displayed on a mobile terminal device such as a smartphone is mirrored on a display device such as HMD (for example, see JP-A-2015-197694).

The mobile terminal device described in JP-A-2015-197694 includes a touch panel and a processor. The processor switches an operation mode of the mobile terminal device from a first mode in which content is displayed on the touch panel and a touch input is received, to a second mode in which the touch input is received without displaying the content on the touch panel, based on configuration information associated with the content. Then, when the operation mode is switched, the content is displayed on the display of the display device.

In the configuration described in JP-A-2015-197694, there is a problem in that an image displayed on the smartphone may be difficult to view.

For example, when the image displayed on the HMD and the image displayed on the smartphone overlap, the image displayed on the smartphone may be difficult to view.

SUMMARY

An aspect for solving the above-described problem is a display system including a display device mounted on a head of a user, and an information processor to which the display device is coupled, wherein the display device includes a first display unit configured to visually recognize an external scene and display a first image overlapping the external scene, and a first display control unit configured to display the first image on the first display unit, the information processor includes a second display unit configured to display a second image, a position input unit arranged at the second display unit, and configured to receive a position input operation to detect coordinates of an operating position, a first determination unit configured to determine whether the second display unit is facing the display device, a detection unit configured to detect a position of the second display unit with respect to the display device, a second determination unit configured to determine whether the position of the second display unit with respect to the display device is included in the first image visually recognized by the first display unit, and an adjustment unit configured to adjust display of the first image on the first display unit based on a determination result of the first determination unit and a determination result of the second determination unit.

In the display system described above, the display device may include an imaging unit configured to capture the external scene, and the first determination unit may be configured to determine, based on an image captured by the imaging unit, whether the second display unit of the information processor is facing the display device.

In the display system described above, the display device may include a line-of-sight detection unit configured to detect a line-of-sight direction of the user, and the first determination unit may be configured to determine, based on a detection result of the line-of-sight detection unit, whether the second display unit of the information processor is facing the display device.

In the display system described above, the information processor may include an infrared ray emitting unit configured to emit infrared ray, the display device may include an infrared ray receiving unit configured to receive the infrared ray, and the first determination unit may be configured to determine, based on a receiving result of the infrared ray receiving unit, whether the second display unit of the information processor is facing the display device.

In the display system described above, the infrared emitting unit may be configured to emit the infrared ray in a normal direction of a display surface of the second display unit In the display system described above, the display device may include a distance sensor configured to detect a distance, and the first determination unit may be configured to determine whether the second display unit is facing the display device based on a distance between the display device and the second display unit detected by the distance sensor.

In the display system described above, the adjustment unit may be configured to adjust the display of the image on the second display unit when the first determination unit determines that the second display unit is facing the display device, and the second determination unit determines that the position of the second display unit with respect to the display device is included in the first image visually recognized by the first display unit.

In the display system described above, the adjustment unit may be configured to reduce a density of an image corresponding to a position of the second display unit in the first image on the first display unit.

In the display system described above, the adjustment unit may be configured to adjust the display of the first image on the first display unit such that the position of the second display unit is not included in the first image.

In the display system described above, the adjustment unit may be configured to hide at least a part of the first image on the first display unit such that the position of the second display unit is not included in the first image.

In the display system described above, the adjustment unit may be configured to move a display position of the first image on the first display unit such that the position of the second display unit is not included in the first image.

In the display system described above, the adjustment unit may be configured to reduce and display the first image such that the position of the second display unit is not included in the first image.

In the display system described above, the information processor may include a second display control unit configured to display the second image on the second display unit, and a transmission unit configured to transmit data indicating the first image to the display device, and the second image may match the first image.

Another aspect for solving the above-described problem is a non-transitory computer-readable storage medium storing a control program for an information processor the information processor is connected to a display device including a first display unit configured to visually recognize an external scene and display an image overlapping the external scene, and includes a second display unit, a position input unit arranged at the second display unit, and a computer, wherein the control program causes the computer to function as a first determination unit configured to determine whether the second display unit is facing the display device, a detection unit configured to detect a position of the second display unit of the information processor with respect to the display device, a second determination unit configured to determine whether the position of the second display unit with respect to the display device is included in the image displayed on the first display unit, and an adjustment unit configured to adjust display of the image on the first display unit, based on a determination result of the first determination unit and a determination result of the second determination unit.

Yet another aspect for solving the above-described problem is a control method for an information processor that is connected to a display device including a first display unit configured to visually recognize an external scene and display an image overlapping the external scene, and that includes a second display unit, a position input unit arranged at the second display unit, and a computer, wherein the control method includes: a first determination step for determining whether the second display unit is facing the display device, a detection step for detecting a position of the second display unit of the information processor with respect to the display device, a second determination step for determining whether the position of the second display unit with respect to the display device is included in the image displayed on the first display unit, and an adjustment step for adjusting display of the image on the first display unit, based on a determination result of the first determination step and a determination result of the second determination step.

DESCRIPTION OF EXEMPLARY EMBODIMENTS

Exemplary embodiments are described below with reference to the accompanying drawings.

1. Configuration of Display System 1-1. Overall Configuration of Display System

Figure 1:
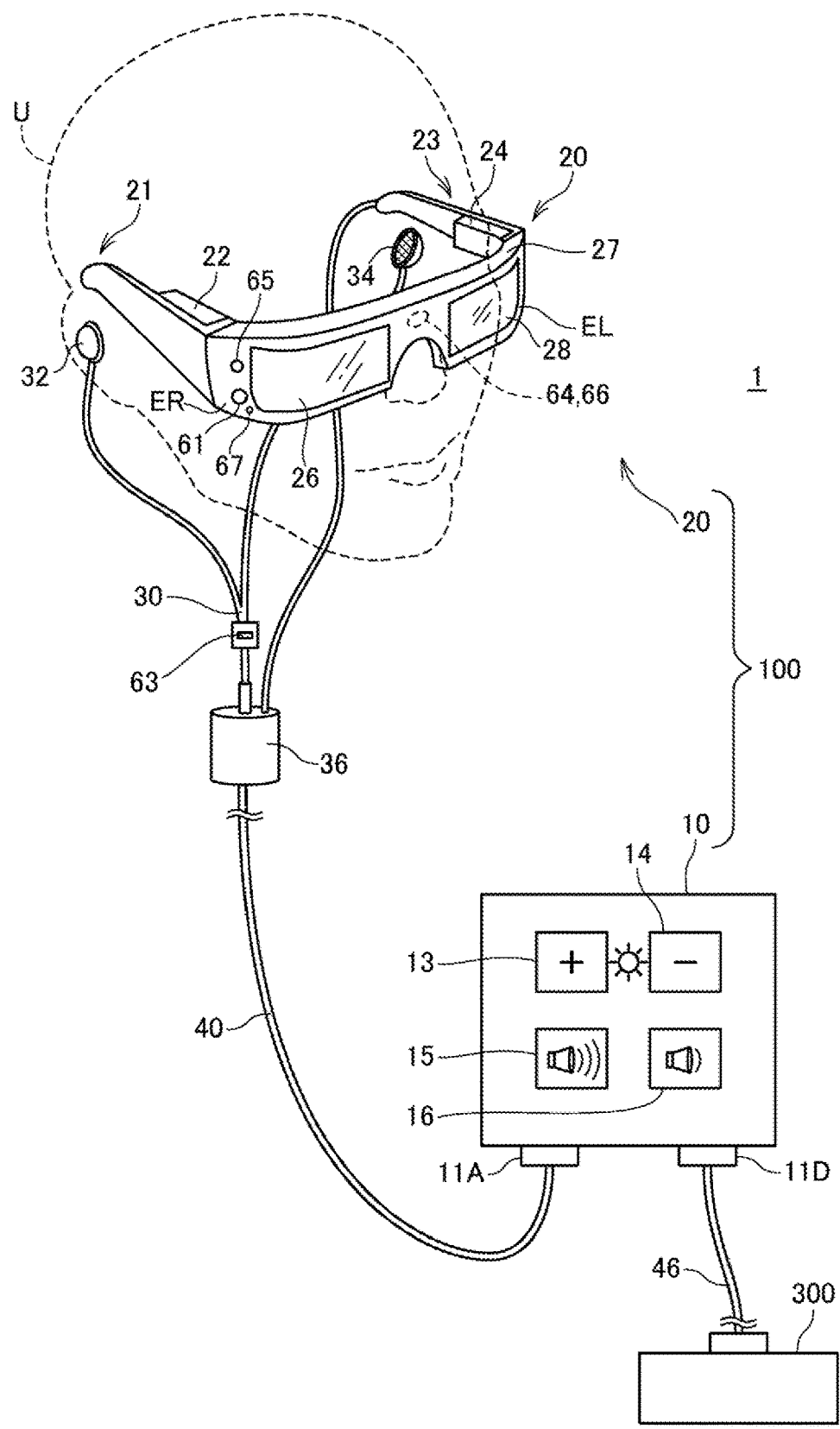
FIG. 1 is a diagram illustrating a configuration of a display system.

FIG. 1 is a diagram illustrating a schematic configuration of a display system 1.

As illustrated in FIG. 1, the display system includes a Head Mounted Display (HMD) 100. The HMD100 is a device including an image display unit 20 mounted on a head of a user and a connection device 10, and is a device for causing a virtual image to be visually recognized by the user while mounted on the head of the user. The HMD 100 corresponds to an example of "display device". In the following description, the user refers to a user who wears and uses the HMD 100.

The connection device 10 includes a connector 11A and a connector 11D in a box-shaped case. The image display unit 20 is connected to the connector 11A via a connection cable 40. Hereinafter, when the connectors 11A and 11D are not distinguished, the connectors 11A and 11D may be referred to as connectors 11. The case of the connection device 10 can be referred to as a housing or a main body.

The display system 1 is a system configured by connecting a smartphone 300 to the HMD 100. The connector 11D is, in the HMD 100, an interface to which the smartphone 300 is connected. That is, in the present exemplary embodiment, the smartphone 300 is connected to the connector 11D. The smartphone 300 corresponds to an example of "information processor".

Note that, the smartphone 300 is only one example of an information processor. The information processor may be portable by the user, and include a display unit configured to display images, a position input unit such as a touch sensor, and a computer. For example, as an information processor, a PDA (Personal Digital Assistant) terminal, a tablet personal computer, or the like can be connected to the connection device 10.

The connectors 11 are wired interfaces to be connected to a communication cable, and the connection device 10 is connected to an external device via the communication cable. The connector 11A includes a terminal configured to connect the connection cable 40 and an interface circuit configured to transmit and receive a signal via the connector 11A.

The connector 11A is provided to connect the image display unit 20 to the connection device 10. The connection cable 40 is configured to supply power from the connection device 10 to the image display unit 20, and the image display unit 20 and the connection device 10 transmit and receive data to and from each other.

The connector 11D is an interface capable of inputting image data from the smartphone 300 and outputting sensor data to the smartphone 300. The smartphone 300 regenerates content data recorded in a non-volatile storage. For example, the connector 11D is a connector conforming to a known communication interface standard.

In the present exemplary embodiment, as an example, the connector 11D is an interface corresponding to input/output of image data and various types of data, and is connected to the smartphone 300 via a USB cable 46.

For example, a connector of a USB(Universal Serial Bus)-Type C standard can be adopted as the connector 11D. The interface corresponding to the USB-Type C is capable of transmitting data according to a USB 3.1 standard and supplying a DC power within 20 volts and 5 amperes.

Further, as a function of an alternative mode of USB-Type C, image data of HDMI (High Definition Multimedia Interface) standard, image data of MHL (Mobile High-definition Link) standard, and the like can be transmitted. The smartphone 300 can provide power supply, transmission and reception of data, and supply of streaming data for image and audio via the USB cable 46. The alternative mode of USB-Type C is known as Alternative mode. HDMI is a registered trademark.

The image display unit 20 has an eyeglasses-like shape in the present exemplary embodiment. The image display unit 20 includes a main body including a right holding part 21, a left holding part 23, and a front frame 27. The main body further includes a right display unit 22, a left display unit 24, a right light-guiding plate 26, and a left light-guiding plate 28.

The image display unit 20 corresponds to an example of a "first display unit".

The right holding part 21 and the left holding part 23 extend rearward from corresponding ends of the front frame 27, to hold the image display unit 20 on the head of the user U. One of the ends of the front frame 27, which lies on the right side of the user U when the user wears the image display unit 20, is referred to as an end ER, while the other one of the ends, which lies on the left side, is referred to as an end EL. The right holding part 21 extends from the end ER of the front frame 27 to a position corresponding to the right side of the head of the user in a state where the user wears the image display unit 20. The left holding part 23 extends from the end EL to a position corresponding to the left side of the head of the user in a state where the user wears the image display unit 20.

The right light-guiding plate 26 and the left light-guiding plate 28 are provided on the front frame 27. The right light-guiding plate 26 is located in front of the right eye of the user in a state where the user wears the image display unit 20, and causes the user to visually recognize an image with the right eye. The left light-guiding plate 28 is located in front of the left eye of the user in a state where the user wears the image display unit 20, and causes the user to visually recognize an image with the left eye.

The front frame 27 has a shape formed by coupling an end of the right light-guiding plate 26 and an end of the left light-guiding plate 28 to each other, and this coupling position corresponds to a position between eyebrows of the user in a state where the user wears the image display unit 20.

The front frame 27 may include a nose pad provided in the coupling position of the right light-guiding plate 26 and the left light-guiding plate 28, and configured to abut on a nose of the user in a state where the user wears the image display unit 20. In this case, the image display unit 20 can be held to the head of the user by the nose pad, the right holding part 21, and the left holding part 23. Further, the right holding part 21 and the left holding part 23 may be connected to a belt that is fits to the back of the head of the user when the user wears the display unit 20. In this case, the image display unit 20 can be held on the head U of the user by the belt.

Each of the right display unit 22 and the left display unit 24 is a module obtained by unitizing an optical unit and a peripheral circuit.

The right display unit 22 is a unit related to display of an image by the right light-guiding plate 26, and is provided on the right holding part 21 and is located near the right side head part of the user in the mounted state. The left display unit 24 is a unit related to image display by the left light-guiding plate 28, and is provided on the left holding part 23 and is located near the left side head part of the user in the mounted state. Note that, the right display unit 22 and the left display unit 24 may be collectively and simply referred to as a "display driving unit".

The right light-guiding plate 26 and the left light-guiding plate 28 are optical parts formed of a light transmissive resin or the like, and are configured to guide imaging light output by the right display unit 22 and the left display unit 24 to the eyes of the user. The right light-guiding plate 26 and the left light-guiding plate 28 are, for example, prisms.

Imaging light guided by the right light-guiding plate 26 and outside light transmitted through the right light-guiding plate 26 are incident on the right eye of the user. Similarly, the imaging light guided by the left light-guiding plate 28 and the outside light transmitted through the left light-guiding plate 28 are incident on the left eye.

An illuminance sensor 65 is arranged on the front frame 27 of the image display unit 20. The illuminance sensor 65 is configured to receive outside light coming from in front of the user wearing the image display unit 20.

A camera 61 is disposed on the front frame 27 of the image display unit 20. The camera 61 is disposed at a position that the outside light transmitted through the right light-guiding plate 26 and the left light-guiding plate 28 is not blocked. In the example of FIG. 1, the camera 61 is arranged on a side of the end ER of the front frame 27, but the camera may also be arranged on a side of the end EL, or may be arranged at a coupling portion between the right light-guiding plate 26 and the left light-guiding plate 28.

The camera 61 corresponds to an example of an "imaging unit".

The camera 61 is a digital camera equipped with an imaging element, such as a Charge Coupled Device (CCD) or a Complementary Metal Oxide Semiconductor (CMOS), and imaging lens and the like. The camera 61 according to the present exemplary embodiment is a monocular camera, but may be a stereo camera.

A Light Emitting Diode (LED) indicator 67 is arranged on the front frame 27. The LED indicator 67 is arranged adjacent to the camera 61 at the end ER and is configured to light up while the camera 61 is operating to notify that the capturing is in progress.

A distance sensor 64 and an infrared sensor 66 are disposed on the front frame 27. The distance sensor 64 is configured to detect a distance to a target object to be measured located in a preset measurement direction. The distance sensor 64 may be a light reflecting type distance sensor including a light source, such as an LED or a laser diode, and a light-receiving unit configured to receive the reflected light that the light emitted by the light source is reflected by the target object to be measured, for example. Further, the distance sensor 64 may be an ultrasonic wave type distance sensor including a sound source configured to generate ultrasonic waves, and a detector configured to receive the ultrasonic waves reflected by the target object to be measured. Further, the distance sensor 64 may use a laser range scanner. In this case, the distance sensor 64 can measure a wider region including the front of the image display unit 20.

The infrared sensor 66 detects infrared ray. Specifically, the infrared sensor 66 detects infrared ray emitted from an infrared communication unit of the smartphone 300. Further, the infrared sensor 66 may be configured as a part of the infrared communication unit. In this case, it is communication-capable with respect to the infrared communication unit of the smartphone 300. For example, the infrared communication unit performs communication based on IrDA standard.

The infrared sensor 66 corresponds to an example of an "infrared ray receiving unit".

Each of the right display unit 22 and the left display unit 24 of the image display unit 20 is connected with the connection device 10. In the HMD 100, the connection cable 40 is connected with the left holding part 23, wiring connected to the connection cable 40 is laid inside the image display unit 20, and each of the right display unit 22 and the left display unit 24 is connected to the connection device 10.

The connection cable 40 includes an audio connector 36, wherein a headset 30 including a right earphone 32 and a left earphone 34 constituting a stereo headphone, and a microphone 63, is connected to the audio connector 36. The right earphone 32 is mounted on the right ear of the user and the left earphone 34 is mounted on the left ear of the user. The right earphone 32 and the left earphone 34 can also be referred to as a sound output unit.

The right earphone 32 and the left earphone 34 output a sound based on a sound signal output from the connection device 10.

The microphone 63 is configured to collect a sound and outputs the sound signal to the connection device 10. The microphone 63 may be, for example, a monaural microphone or a stereo microphone, or may be a directional microphone or a non-directional microphone.

The connection device 10 includes a brightness adjustment key 13, a brightness adjustment key 14, a sound volume adjustment key 15, and a sound volume adjustment key 16 as operated parts to be operated by the user. Each of the brightness adjustment key 13, the brightness adjustment key 14, the volume adjustment key 15, and the volume adjustment key 16 is configured by a hardware key. These operated parts are arranged on the surface of the main body of the connection device 10, and may be operated by fingers of the user, for example.

The brightness adjustment keys 13 and 14 are hardware keys configured to adjust the display brightness of the image displayed by the image display unit 20. The brightness adjustment key 13 is configured to instruct an increase in brightness, and the brightness adjustment key 14 is configured to instruct a reduction in brightness. The volume adjustment keys 15 and 16 are hardware keys configured to adjust volume of the sound output from the right earphone 32 and the left earphone 34. The volume adjustment key 15 is configured to instruct an increase in volume, and the sound volume adjustment key 16 is configured to instruct a reduction in volume.

1-2. Configuration of Optical System of Image Display Unit

Figure 2:
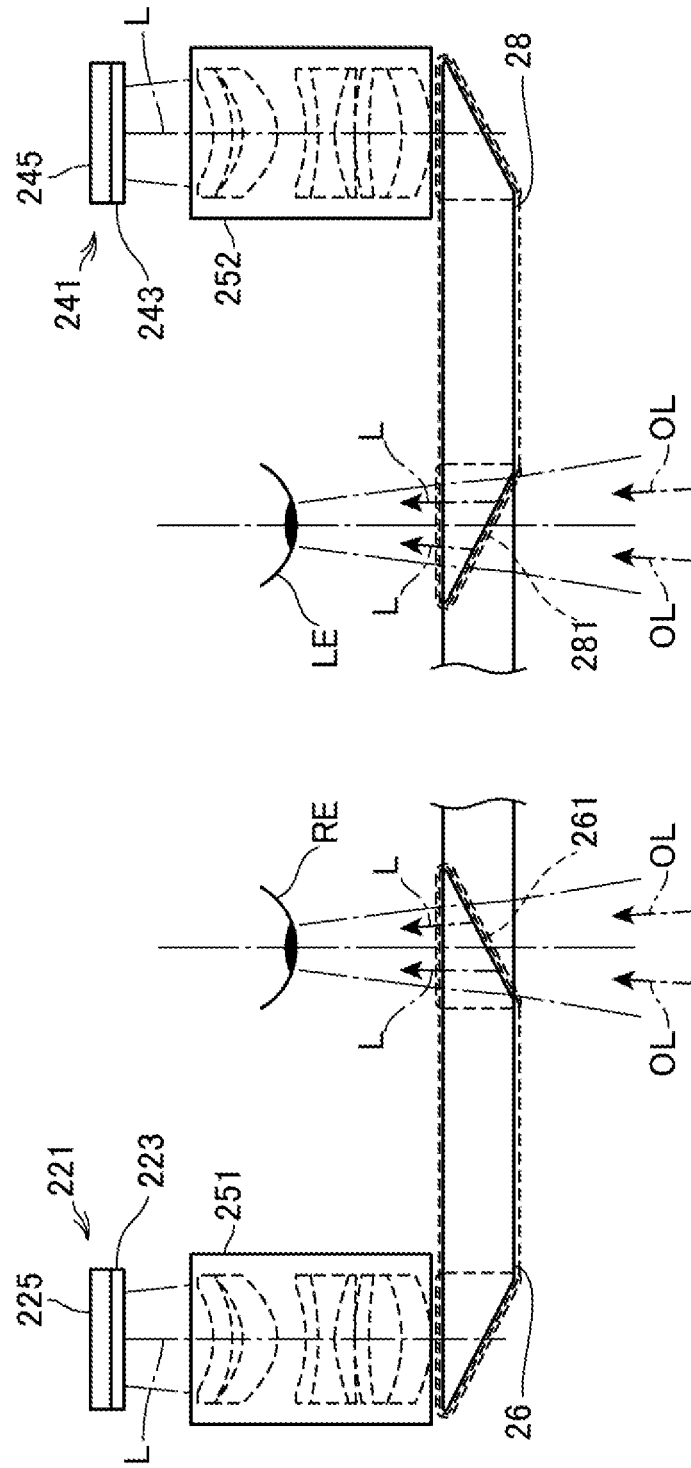
FIG. 2 is a diagram illustrating a configuration of an optical system of an image display unit.

FIG. 2 is a plan view illustrating a main part of a configuration of an optical system included in the image display unit 20. In FIG. 2, a left eye LE and a right eye RE of the user are illustrated for explanation.

As illustrated in FIG. 2, the right display unit 22 and the left display unit 24 are disposed symmetrically on right and left sides. As a configuration where the right eye RE of the user is caused to visually recognize an image, the right display unit 22 includes an Organic Light-Emitting Diode (OLED) unit 221 configured to emit imaging light. Additionally, the right display unit 22 includes a right optical system 251 including a lens group configured to guide imaging light L emitted by the OLED unit 221, and the like. The imaging light L is guided by the right optical system 251 to the right light-guiding plate 26.

The OLED unit 221 includes an OLED panel 223 and an OLED drive circuit 225 configured to drive the OLED panel 223. The OLED panel 223 is a self-light emission type display panel including light-emitting elements disposed in a matrix and configured to emit light by organic electroluminescence to emit red (R) color light, green (G) color light, and blue (B) color light respectively. The OLED panel 223 has, as one pixel, a unit including one R element, one G element, and one B element, and includes a plurality of the pixels, and the OLED panel 223 forms an image with the plurality of pixels disposed in a matrix. The OLED drive circuit 225 is controlled by a first control unit 120 to select and power the light-emitting elements included in the OLED panel 223 to cause the light-emitting elements of the OLED panel 223 to emit light. The first control unit 120 will be described below with reference to FIG. 4.

Figure 4:
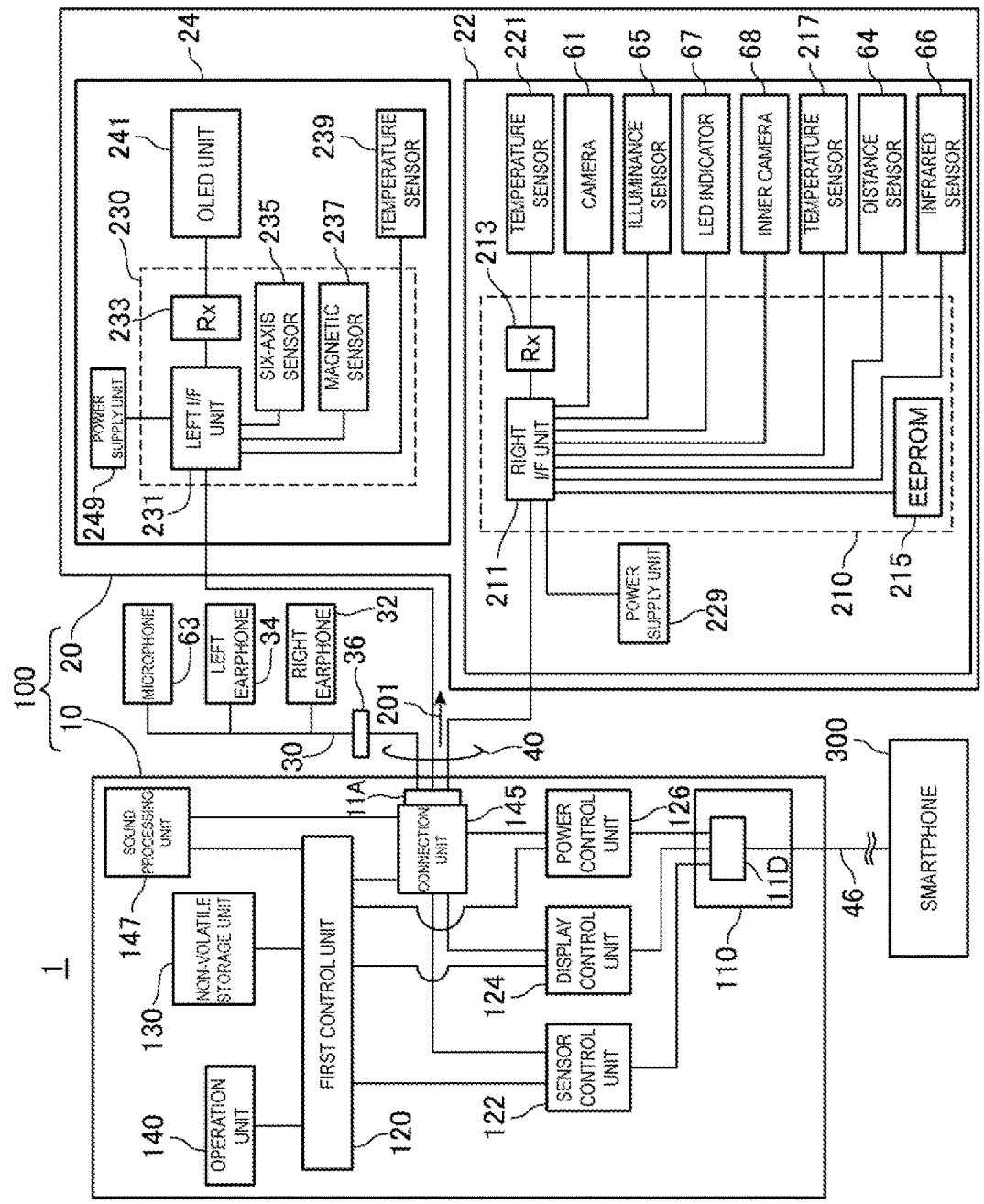
FIG. 4 is a diagram illustrating a configuration of each component configuring a HMD.

The OLED drive circuit 225 is fixed by bonding or the like to a rear face of the OLED panel 223, namely, a back side of a light-emitting surface of the OLED panel 223. The OLED drive circuit 225 may include, for example, a semiconductor device configured to drive the OLED panel 223, and may be mounted on a substrate (not illustrated) fixed to the rear face of the OLED panel 223. A temperature sensor 217 illustrated in FIG. 4 is mounted on this substrate.

Note that, the OLED panel 223 may include a configuration in which light-emitting elements configured to emit white color light are disposed in a matrix, and color filters corresponding to the R color, the G color, and the B color respectively are disposed to overlap the light-emitting elements. Additionally, the OLED panel 223 of a WRGB configuration including light-emitting elements configured to emit white (W) color light may be used, in addition to the light-emitting elements configured to emit the R color light, the G color light, and the B color light respectively.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The imaging light L is reflected by the half mirror 261 to be emitted from the right light-guiding plate 26 toward the right eye RE, and this imaging light L forms an image on a retina of the right eye RE, and causes the user to visually recognize the image.

Additionally, as a configuration in which the left eye LE of the user is caused to visually recognize an image, the left display unit 24 includes an OLED unit 241 configured to emit imaging light, and a left optical system 252 including a lens group configured to guide the imaging light L emitted by the OLED unit 241, and the like. The imaging light L is guided by the left optical system 252 to the left light-guiding plate 28.

The OLED unit 241 includes an OLED panel 243, and an OLED drive circuit 245 configured to drive the OLED panel 243. The OLED panel 243 is a self-light emission type display panel configured in a manner similar to the OLED panel 223. The OLED drive circuit 245 is instructed by the first control unit 120 to select and power the light-emitting elements included in the OLED panel 243 to cause the light-emitting elements of the OLED panel 243 to emit light.

The OLED drive circuit 245 is fixed by bonding or the like to a rear face of the OLED panel 243, namely, a back side of a light-emitting surface of the OLED panel 243. The OLED drive circuit 245 may include, for example, a semiconductor device configured to drive the OLED panel 243, and may be mounted on a substrate (not illustrated) fixed to the rear face of the OLED panel 243. A temperature sensor 239 illustrated in FIG. 4 is mounted on this substrate.

The left optical system 252 includes a collimate lens configured to collimate the imaging light L emitted from the OLED panel 243. The imaging light L collimated by the collimate lens enters the left light-guiding plate 28. The left light-guiding plate 28 is an optical element in which a plurality of reflective faces configured to reflect the imaging light L is formed, and the left light-guiding plate 28 is, for example, a prism. The imaging light L is reflected multiple times inside the left light-guiding plate 28 and then, is guided to the left eye LE side. In the left light-guiding plate 28, a half mirror 281 (reflective face) located in front of the left eye LE is formed. The imaging light L is reflected by the half mirror 281 to be emitted from the left light-guiding plate 28 to the left eye LE, and this imaging light L forms an image on a retina of the left eye LE, and causes the user to visually recognize the image.

According to the configuration, the HMD 100 serves as a transmissive display device. Namely, the imaging light L reflected by the half mirror 261 and outside light OL having passed through the right light-guiding plate 26 enter the right eye RE of the user. Additionally, the imaging light L reflected by the half mirror 281 and the outside light OL having passed through the half mirror 281 enter the left eye LE. Accordingly, the HMD 100 overlaps the imaging light L of an image processed internally with the outside light OL, and causes the imaging light L and the outside light OL to overlap and enter the eyes of the user, and the user views an external scene through the right light-guiding plate 26 and the left light-guiding plate 28, and visually recognizes an image that is formed by the imaging light L and that overlaps the external scene.

The half mirrors 261 and 281 are image-extracting units configured to reflect the imaging light output by the right display unit 22 and the left display unit 24 respectively to extract images, and can be referred to as a display unit.

Note that the left optical system 252 and the left light-guiding plate 28 are collectively referred to as a "left light-guiding unit", and the right optical system 251 and the right light-guiding plate 26 are collectively referred to as a "right light-guiding unit". Configurations of the right light-guiding unit and the left light-guiding unit are not limited to the example described above, and can use any manner as long as imaging light is used to form a virtual image in front of the eyes of the user. For example, a diffraction grating may be used, or a semi-transmissive reflection film may be used.

Figure 3:
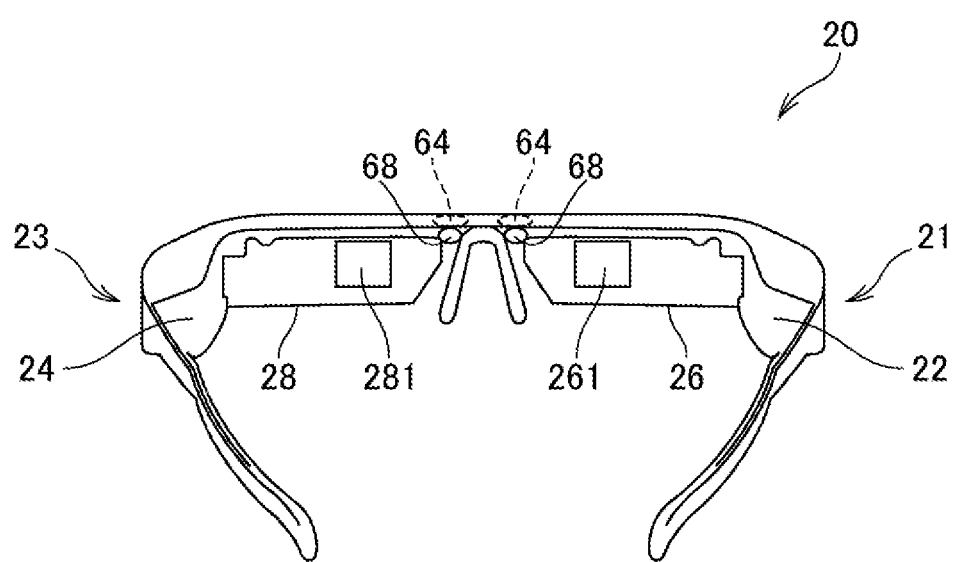
FIG. 3 is a perspective view illustrating a configuration of a main part of the image display unit.

FIG. 3 is a diagram illustrating a configuration of a main part of the image display unit 20. FIG. 3 is a perspective view of the main part of the image display unit 20 seen from a head side of the user. Note that, in FIG. 3, illustration of the connection cable 40 is omitted.

FIG. 3 illustrates a side contacting the head of the user of the image display unit 20, that is, a side seen from the right eye RE and the left eye LE of the user. In other words, in FIG. 3, back sides of the right light-guiding plate 26 and the left light-guiding plate 28 are visible.

In FIG. 3, the half mirror 261 configured to irradiate the right eye RE of the user with imaging light and the half mirror 281 configured to irradiate the left eye LE with imaging light are visible as approximately square-shaped regions. Further, the outside light, as described above, is transmitted through the entire part of the right light-guiding plate 26 including the half mirror 261 and the entire part of the left light-guiding plate 28 including the half mirror 281. Thus, the user visually recognizes an external scene through all the right light-guiding plate 26 and the left light-guiding plate 28, and visually recognizes rectangular display images at positions of the half mirrors 261 and 281.

Further, inner cameras 68 is arranged on the user side of the image display unit 20. A pair of inner cameras 62 are provided at central positions of the right light-guiding plate 26 and the left light-guiding plate 28 so as to correspond respectively to the right eye RE and the left eye LE of the user. The inner cameras 68 are a pair of cameras that respectively capture images of the right eye RE and the left eye LE of the user. The inner cameras 68 capture images according to instructions from the first control unit 120. The first control unit 120 analyzes the captured image data of the inner cameras 68. For example, the first control unit 120 detects images of reflected lights on the surfaces or pupils of the eyeballs of the right eye RE and the left eye LE, from the captured imaging data of the inner cameras 68, and determines a line-of-sight direction of the user. Further, the first control unit 120 may detect the eyeball movement of each of the right eye RE and the left eye LE, to obtain a change of the line-of-sight direction of the user.

Here, the movement of the line-of-sight of the user can also be regarded as movement of the virtual viewpoint of the user.

When detecting the line-of-sight directions of the right eye RE and the left eye LE from the captured image of the inner camera(s) 68, the first control unit 120 can determine convergence angles of the right eye RE and the left eye LE. The convergence angle PA corresponds to a distance to an object that the user is watching. That is, when the user visually recognizes a stereoscopic image or object, the convergence angle of the right eye RE and the left eye LE is determined according to the distance to the object to be visually recognized. Therefore, by detecting the convergence angle, a distance from the user to the object that is being watched can be determined. Further, by displaying the image so as to guide the convergence angle of the user, a stereoscopic vision can be induced.

1-3. Components Configuration of HMD

FIG. 4 is a diagram illustrating a configuration of components configuring the HMD 100.

The right display unit 22 of the image display unit 20 includes a right display unit substrate 210. On the right display unit substrate 210, a right I/F unit 211 connected to the connection cable 40, a receiving unit 213 configured to receive data input from the connection device 10 via the right I/F unit 211, and an Electrically Erasable Programmable Read Only Memory (EEPROM) 215 are mounted. The right I/F unit 211 connects the receiving unit 213, the EEPROM 215, the temperature sensor 217, the camera 61, the distance sensor 64, the illuminance sensor 65, the infrared sensor 66, the LED indicator 67, and the inner cameras 68 to the connection device 10. The receiving unit 213 connects the OLED unit 221 to the connection device 10.

The left display unit 24 includes a left display unit substrate 230. On the left display unit substrate 230, a left I/F unit 231 connected to the connection cable 40, and a receiving unit 233 configured to receive data input from the connection device 10 via the left I/F unit 231 are mounted. Further, on the left display unit substrate 230, a six-axis sensor 235 and a magnetic sensor 237 are mounted.

The left I/F unit 231 connects the receiving unit 233, the six-axis sensor 235, the magnetic sensor 237, and the temperature sensor 239 to the connection device 10. The receiving unit 233 connects the OLED unit 241 to the connection device 10.

I/F is an abbreviation for interface. Note that, in the present exemplary embodiment, the receiving unit 213 and the reception unit 233 may be respectively described as Rx213 and Rx233.

The EEPROM 215 is configured to store various types of data in a non-volatile manner. The EEPROM 215 stores, for example, data relating to light-emitting properties and display properties of the OLED units 221 and 241 included in the image display unit 20, and data relating to properties of sensors included in the right display unit 22 or the left display unit 24.

Specifically, the EEPROM 215 stores parameters regarding gamma correction of the OLED units 221 and 241, data used to compensate for detection values of the temperature sensors 217 and 239, and the like. These types of data are generated by inspection at the time of factory shipment of the HMD 100, and are written into the EEPROM 215. The data stored in the EEPROM 215 is readable for the first control unit 120.

The camera 61 is configured to capture an image according to a signal input via the right I/F unit 211 and output captured image data to the right I/F unit 211.

The illuminance sensor 65 is configured to receive the outside light and output a detection value corresponding to an amount of the received light or an intensity of the received light. The LED indicator 67 is configured to light up according to a control signal or a driving current input via the right I/F unit 211.

The inner camera(s) 68 is configured to capture an image according to a signal input via the right I/F unit 211 and output captured image data to the right I/F unit 211.

The temperature sensor 217 is configured to detect a temperature of the OLED unit 221, and output a voltage value or a resistance value corresponding to the detected temperature as a detection value.

The distance sensor 64 is configured to execute distance detection, and output a signal indicating a detection result to the connection device 10 via the right I/F unit 211. As the distance sensor 64, for example, an infrared ray type depth sensor, an ultrasonic type distance sensor, a Time Of Flight type distance sensor, a distance detecting unit configured to combine image detection and sound detection, or the like can be used. Further, the distance sensor 64 may be configured to detect a distance by processing an image obtained by stereo photographing by a stereo camera or a monocular camera.

The infrared sensor 66 is configured to execute infrared detection, and output a signal indicating a detection result to the connection device 10 via the right I/F unit 211.

The receiving unit 213 is configured to receive image data for displaying transmitted from the connection device 10 via the right I/F unit 211, and output the image data to the OLED unit 221. The OLED unit 221 displays an image based on the image data transmitted by the connection device 10.

Further, the receiving unit 233 is configured to receive image data for displaying transmitted from the connection device 10 via the left I/F unit 231, and output the image data to the OLED unit 241. The OLED units 221 and 241 display an image based on the image data transmitted by the connection device 10.

The six-axis sensor 235 is a motion sensor including a three-axis acceleration sensor and a three-axis gyro sensor. As the six-axis sensor 235, an Inertial Measurement Unit (IMU) including the above-described sensors as modules may be adopted. The magnetic sensor 237 is a three-axis geomagnetic sensor, for example. A gyro sensor is also referred to as an angular velocity sensor.

The temperature sensor 239 is configured to detect a temperature of the OLED unit 241, and output a voltage value or a resistance value corresponding to the detected temperature as a detection value.

Each component of the image display unit 20 operates with power supplied from the connecting device 10 via the connecting cable 40.

The image display unit 20 includes a power supply unit 229 on the right display unit 22, and a power supply unit 249 on the left display unit 24. The power supply unit 229 is configured to distribute and supply the power supplied by the connection device 10 via the connection cable 40 to each component of the right display unit 22 including the right display unit substrate 210. Similarly, the power supply unit 249 is configured to distribute and supply the power supplied by the connection device 10 via the display unit connection cable 40 to each component of the left display unit 24 including the left display unit substrate 230. The right display unit 22 and the left display unit 24 may include a conversion circuit or the like configured to convert a voltage.

The connection device 10 includes an I/F unit 110, a first control unit 120, a sensor control unit 122, a display control unit 124, a power control unit 126, a non-volatile storage unit 130, an operating unit 140, a connection unit 145, and a sound processing unit 147.

The I/F unit 110 includes connector 11D. Further, the I/F unit 110 includes interface circuits connected to the connector 11D and configured to execute communication protocols conforming to respective communication standards.

The I/F unit 110 may be, for example, an interface substrate on which the connector 11D and the interface circuit are mounted. Further, a configuration may be adopted in which the first control unit 120, the sensor control unit 122, the display control unit 124, and the power control unit 126 of the connection device 10 are mounted on a connection device main substrate (not illustrated). In this case, on the connection device main substrate, the connector 11D and the interface circuit of the I/F unit 110 may be mounted.

Additionally, the I/F unit 110 may include, for example, an interface for a memory card capable of being connected to an external storage medium, or the like, or the I/F unit 110 may be configured by a wireless communication interface.

The first control unit 120 is configured to control each component of the connection device 10. The first control unit 120 includes a processor such as a Central Processing Unit (CPU). The control unit 120 causes the processor to execute a program to control each component of the HMD 100 in cooperation between software and hardware. The first control unit 120 is connected to the non-volatile storage unit 130, the operating unit 140, the connection unit 145, and the sound processing unit 147.

The sensor control unit 122 is configured to control the camera 61, the distance sensor 64, the illuminance sensor 65, the infrared sensor 66, the temperature sensor 217, the six-axis sensor 235, the magnetic sensor 237, and the temperature sensor 239. Specifically, the sensor control unit 122 is configured to set and initialize a sampling period of each sensor according to the control of the first control unit 120, and execute energization of each sensor, transmission of control data, acquisition of detection values and the like, according to the sampling period of each sensor.

The sensor control unit 122 is connected to the connector 11D of the I/F unit 110, and is configured to output the data regarding the detection value acquired from each sensor to the connector 11D at a preset timing. The smartphone 300 connected to the connector 11D can acquire detection values of each sensor of the HMD 100, the captured image data of the camera 61, and data indicating the line-of-sight direction detected by the inner camera(s) 68.

The display control unit 124 is configured to execute various processes for causing the image display unit 20 to display an image based on the image data input to the I/F unit 110. In the present exemplary embodiment, an image signal output from the smartphone 300 is input to the connector 11D. The image signal is digital image data, but may be an analog image signal.

For example, the display control unit 124 is configured to execute various processes such as frame cutout, resolution conversion, intermediate frame generation, and frame rate conversion. Resolution conversion includes so-called scaling. The display controller 124 is configured to output image data corresponding to each of the OLED unit 221 of the OLED unit 241 to the connection unit 145. The image data input to the connection unit 145 is transmitted from the connector 11A to the right I/F unit 211 and the left I/F unit 231 as an image signal 201. The image signal 201 is digital video data processed corresponding to each of the OLED unit 221 and the OLED unit 241.

In the present exemplary embodiment, the connector 11D is configured by a USB-Type C connector. The display control unit 124 receives image data transmitted in an alternative mode of USB-Type C via the connector 11D.

The sensor control unit 122 and/or the display control unit 124 may be realized by cooperation of software and hardware by causing a processor to execute a program. That is, the sensor control unit 122 and the display control unit 124 are configured by a processor to execute the operations described above by executing a program. In this example, the sensor control unit 122 and the display control unit 124 may be realized by a processor configuring the first control unit 120 by executing a program. In other words, the processor may function as the first control unit 120, the display control unit 124, and the sensor control unit 122 by executing a program. Here, the processor can be paraphrased as a computer.

Further, the display control unit 124 and the sensor control unit 122 may be configured by programmed hardware such as a Digital Signal Processor (DSP) or a Field Programmable Gate Array (FPGA), and the like. Further, the sensor control unit 122 and the display control unit 124 may be integrated and configured as a System-on-a-Chip (SoC)-FPGA.

The power control unit 126 is connected to the connector 11D. The power control unit 126 is configured to, based on power supplied from the connector 11D, supply power to each component of the connection device 10 and to the image display unit 20. Further, the power control unit 126 may include a voltage conversion circuit (not illustrated), and may be configured to supply the concerted voltage to each component of the connection device 10 and the image display unit 20. The power control unit 126 may be configured by a programmed semiconductor device such as a logic circuit or FPGA. Further, the power control unit 126 may be configured by hardware common to the sensor control unit 122 and/or the display control unit 124.

The sensor control unit 122, the display control unit 124, and the power control unit 126 may include a work memory for executing data processing, or may use the memory of the first control unit 120 to execute processing.

The operating unit 140 is configured to detect an operation on the operated part included in the connection device 10 and outputs data indicating an operation content or an operation signal indicating the part to be operated to the first control unit 120.

The sound processing unit 147 is configured to generate a sound signal according to sound data input from the first control unit 120, and output the sound signal to the connection unit 145. This sound signal is output from the connection unit 145 to the right earphone 32 and the left earphone 34 via the audio connector 36. Additionally, the sound processing unit 147 is configured to adjust the volume of the sound signal under the control of the first control unit 120. Additionally, the sound processing unit 147 is configured to generate sound data of the sound collected by the microphone 63, and output the sound data to the first control unit 120. The sound data may be processed by the first control unit 120 in the same manner as the detection value of the sensor included in the image display unit 20.

Additionally, the connection device 10 may include a battery (not illustrated), and may be configured to supply power from the battery to each component of the connection device 10 and the image display unit 20. The battery included the connection device 10 may be a rechargeable secondary battery.

1-4. Configuration of Smartphone

Figure 5:
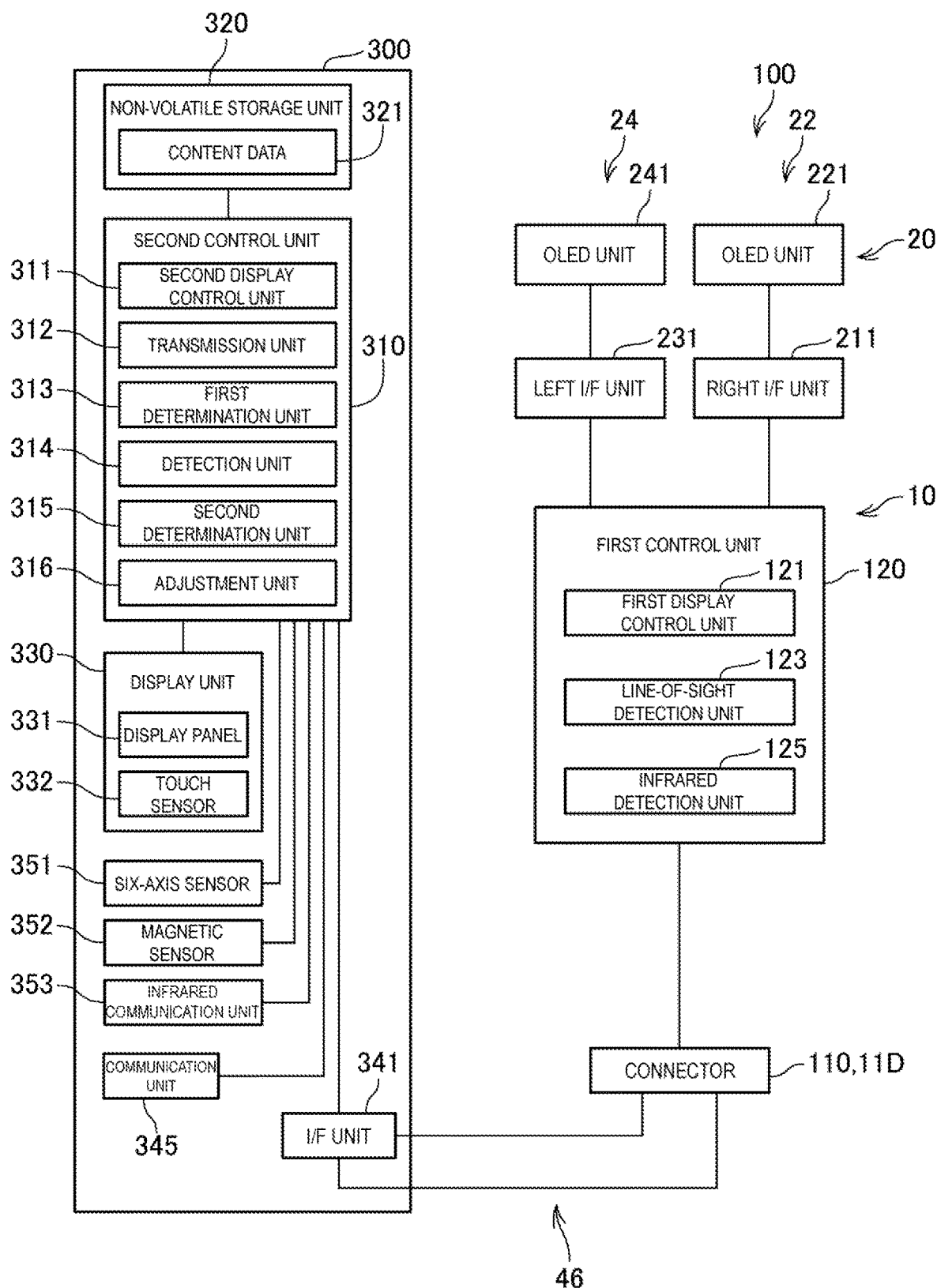
FIG. 5 is a diagram illustrating a configuration of a first control unit of the HMD and a smartphone.

FIG. 5 is a diagram illustrating a configuration of the first control unit 120 of the HMD 100 and the smartphone 300.

The smartphone 300 includes a second control unit 310, a non-volatile storage unit 320, a display unit 330, an I/F unit 341, a communication unit 345, a six-axis sensor 351, a magnetic sensor 352, and an infrared communication unit 353.

The second control unit 310 (electronic device control unit) includes a processor (not illustrated) such as a CPU or a microcomputer, and is configured to control each component of the smartphone 300 by causing the processor to execute a control program. The second control unit 310 may include a Read Only Memory (ROM) configured to store a control program executed by the processor in a non-volatile manner, and a Random Access Memory (RAM) constituting a work area of the processor. The processor corresponds to an example of a "computer". The control program stored in the memory of the second control unit 310 corresponds to an example of a "control program".

The non-volatile storage unit 320 is configured to store, in a non-volatile manner, a program to be executed by the second control unit 310 and data to be processed by the second control unit 310. The non-volatile storage unit 130 is, for example, a magnetic recording device such as a Hard Disk Drive (HDD), or a storage device using a semiconductor storage element such as a flash memory.

The non-volatile storage unit 320 is configured to store, for example, content data 321 of contents including an image. The content data 321 is a file in a format that the second control unit 310 can process, includes image data, and may include sound data.

Additionally, the non-volatile storage unit 320 is configured to store an Operating System (OS) as a basic control program to be executed by the second control unit 310, an application program operating by using the OS as a platform, and the like. Additionally, the non-volatile storage unit 320 is configured to store data to be processed during execution of the application program, data of processing results, and the like.

A display panel 331 and a touch sensor 332 included in the display unit 330 are connected with the second control unit 310. The display panel 331 is configured to display various images based on the control of the second control unit 310. The display panel 331 is configured by, for example, a Liquid Crystal Display (LCD). The display panel 331 is configured in a rectangular shape. In the present exemplary embodiment, the display panel 331 has a rectangular shape.

The display panel 331 corresponds to an example of a "second display unit".

The touch sensor 332 is configured to detect a touch operation and output data indicating the detected operation to the second control unit 310. The touch operation corresponds to an example of a "position input operation".

The touch sensor 332 is integrally formed with the display panel 331. Specifically, the touch sensor 332 is formed on an image display surface of the display panel 331. In the present exemplary embodiment, the touch sensor 332 has a rectangular shape. The data output by the touch sensor 332 is coordinate data indicating an operating position in the touch sensor 332, or the like.

The touch sensor 332 corresponds to an example of a "position input unit".

The I/F unit 341 is an interface connected to an external device. For example, the I/F unit 341 is configured to execute communication compliant with standards such as an HDMI interface and a USB interface. The I/F unit 341 includes a connector configured to connect the USB cable 46 and an interface circuit that processes a signal transmitted via the connector. The I/F unit 341 is an interface substrate including a connector and an interface circuit, and is connected to a main substrate on which a processor of the second control unit 310 is mounted. Alternatively, the connector and the interface circuit constituting the I/F unit 341 are mounted on the main substrate of the smartphone 300.

In the present exemplary embodiment, the I/F unit 341 includes a USB interface, and is connected to the connector 11D via the USB cable 46. For example, the second control unit 310 is configured to output image data via the USB cable 46, and receive data and the like related to an output value of the sensor from the connection device 10.

Additionally, the I/F unit 341 may be a wireless communication interface. In this case, the I/F unit 341 can be an interface substrate on which a communication circuit including a Radio Frequency (RF) unit is mounted, or can be a circuit mounted on the main substrate.

The communication unit 345 is a communication interface configured to execute data communication with the external device. The communication unit 345 may be a wired communication interface capable of being connected with a cable, or may be a wireless communication interface For example, the communication unit 345 may be a wired LAN interface supporting Ethernet (registered trademark), or a wireless LAN interface compatible with IEEE802.11 standard.

The communication unit 345 is, for example, a communication interface that connects to another smartphone via a wireless telephone line.

The six-axis sensor 351 is a motion sensor including a three-axis acceleration sensor and a three-axis gyro sensor. The six-axis sensor 351 may adopt an IMU in which the sensors described above are provided as a module. The magnetic sensor 352 is a three-axis geomagnetic sensor, for example. A gyro sensor is also referred to as an angular velocity sensor.

The infrared communication unit 353 is configured to perform infrared communication with another smartphone. Further, the infrared communication unit 353 is configured to emit infrared ray in the normal direction of the display surface of the display panel 331. When the infrared ray emitted from the infrared communication unit 353 is received by the infrared sensor 66 of the HMD 100, the display panel 331 faces the HMD100. The detail will be described below with reference to FIG. 7.

The infrared communication unit 353 corresponds to an example of an "infrared ray emitting unit".

The second control unit 310 includes a second display control unit 311, a transmission unit 312, a first determination unit 313, a detection unit 314, a second determination unit 315, and an adjustment unit 316. Specifically, the second controller 310 functions as the second display control unit 311, the transmission unit 312, the first determination unit 313, the detection unit 314, the second determination unit 315, and the adjustment unit 316, by causing the processor included in the second control unit 310 to execute the control program.

The second display control unit 311 is configured to regenerate the content data 321, and display a second image PT2 corresponding to the image data included in the content data 321 on the display panel 331 of the display unit 330.

The transmission unit 312 transmits data indicating the second image PT2 to the HMD 100. Specifically, the transmission unit 312 transmits data indicating the second image PT2 to the first control unit 120 of the HMD 100 via the I/F unit 341 and the connector 11D.

The first determination unit 313 determines whether the display panel 331 is facing the HMD 100. Specifically, when first condition, second condition, and third condition described below are satisfied, the first determination unit 313 determines that the display panel 331 is facing the HMD 100.

First condition: The display panel 331 is positioned within the field of view of the user.

Second condition: The HMD 100 is positioned in the normal direction of the display surface of the display panel 331.

Third condition: The distance between the display panels 331 and the HMD 100 is not greater than the threshold distance.

Specifically, the first determination unit 313 determines whether the first condition is satisfied according to the line-of-sight direction detected by the first control unit 120, based on the image of the external scene formed by the camera 61 and the image formed by the inner camera(s) 68.

The first determination unit 313 determines whether the second condition is satisfied based on the image of the external scene formed by the camera 61 and the image formed by the inner camera(s) 68. Further, the first determination unit 313 determines whether the second condition is satisfied based on the detection result of the infrared sensor 66 transmitted from the first control unit 120 of the HMD 100.

The first condition and the second condition will be described in detail later with reference to FIG. 6 and FIG. 7.

Further, the first determination unit 313 determines whether the third condition is satisfied based on the distance between the display panel 331 and the HMD 100 detected by the distance sensor 64.

The third condition will be described in detail later with reference to FIG. 6.

The detection unit 314 detects the position of the display panel 331 with respect to the HMD 100. Specifically, the detection unit 314 detects the position of the display panel 331 with respect to the HMD 100 based on the image of the external scene captured by the camera 61.

The second determination unit 315 determines whether the position of the display panel 331 of the smartphone 300 with respect to the HMD 100 is included in a first image PT1 visually recognized by the image display unit 20. Specifically, the second determination unit 315 determines whether the position of the display panel 331 with respect to the HMD 100 detected by the detection unit 314 is included in the first image PT1 visually recognized by the image display unit 20.

More specifically, the second determination unit 315 determines whether the position of the display panel 331 of the smartphone 300 with respect to the HMD100 is included in the first image PT1 visually recognized by the image display unit 20, based on the image captured by the camera 61. The camera 61 captures an external scene image in a wider range than the field of view of the user.

First, the second determination unit 315 acquires external scene image data captured by the camera 61 from the HMD 100, and extracts the external scene image included in the first image PT1 from the external scene image captured by the camera 61.

Then, the second determination unit 315 determines whether the display panel 331 of the smartphone 300 is included in the extracted external scene image. Note that, the determination of whether the display panel 331 of the smartphone 300 is included in the extracted external scene image is performed using image processing or the like, for example.

The adjustment unit 316 adjusts the display of the first image PT1 on the image display unit 20 of the HMD 100, based on the determination result of the first determination unit 313 and the determination result of the second determination unit 315. That is, the adjustment unit 316 instructs the first control unit 120 of the HMD 100 to adjust the display of the first image PT1 on the image display unit 20. The first control unit 120 adjusts the display of the first image PT1 on the image display unit 20 according to an instruction from the adjustment unit 316.

Specifically, when fourth condition and the fifth condition described below are satisfied, the adjustment unit 316 adjusts the display of the first image PT1 on the image display unit 20.

Fourth condition: The first determination unit 313 determines that the display panel 331 is facing the HMD 100.

Fifth condition: The second determination unit 315 determines that the position of the display panel 331 of the smartphone 300 with respect to the HMD 100 is included in the first image PT1 visually recognized by the image display unit 20.

For example, the adjustment unit 316 adjusts the display of the first image PT1 on the image display unit 20 of the HMD 100 such that the position of the display panel 331 is not included in the first image PT1.

Specifically, the adjustment unit 316 hides a part of the first image PT1 such that the position of the display panel 331 is not included in the first image PT1. Further, the adjustment unit 316 moves the display position of the first image PT1 in the image display unit 20 such that the position of the display panel 331 is not included in the first image PT1. Further, the adjustment unit 316 reduces and displays the first image PT1 on the image display unit 20 such that the position of the display panel 331 is not included in the first image PT1.

The processing of the adjustment unit 316 will be described in detail later with reference to FIG. 8 to FIG. 10.

The processing of the second control unit 310 will be described in detail later with reference to FIG. 11.

1-5. Configuration of First Control Unit of Hmd

The first control unit 120 of the HMD 100 includes a first display control unit 121, a line-of-sight detection unit 123, and an infrared detection unit 125. Specifically, the first control unit 120 functions as the first display control unit 121, the line-of-sight detection unit 123, and the infrared detection unit 125 by causing the processor included in the first control unit 120 to execute a control program.

The first display control unit 121 displays the first image PT1. Specifically, the first display control unit 121 receives the second image PT2 from the smartphone 300, and displays the received second image PT2 as the first image PT1 on the image display unit 20. That is, the first image PT1 matches the second image PT2. In other words, the first image PT1 indicates the same image as the second image PT2. In this case, the image display unit 20 of the HMD 100 displays the same image as the image displayed on the display panel 331, and performs so-called "mirroring display".

More specifically, the first display control unit 121 generates a right image and a left image according to the second image PT2 received from the smartphone 300. Then, the first display control unit 121 displays the right image on the right display unit 22, and displays the left image on the left display unit 24.

More specifically, the first display control unit 121 transmits the right image to the OLED unit 221 via the right I/F unit 211, and displays the right image on the OLED unit 221. Further, the first display control unit 121 transmits the left image to the OLED unit 241 via the left I/F unit 231, and displays the left image on the OLED unit 241.

Further, the first display control unit 121 adjusts the display of the first image PT1 on the image display unit 20, according to an instruction from the adjustment unit 316 of the second control unit 310 of the smartphone 300.

The line-of-sight detection unit 123 detects the direction of the line-of-sight direction of the user. Specifically, the line-of-sight detection unit 123 detects the line-of-sight direction of the user by analyzing the captured image data of the inner cameras 68. For example, the line-of-sight detection unit 123 detects an image of reflected light on the eyeball surfaces or the pupils of the right eye RE and the left eye LE, from the captured image data of the inner cameras 68, and detects the line-of-sight direction of the user.

The line-of-sight detection unit 123 transmits data indicating the line-of-sight direction of the user to the second control unit 310.

The infrared detection unit 125 acquires the detection result from the infrared sensor 66, and transmits data indicating the detection result to the second control unit 310 via the connector 11D and the I/F unit 341.

2. Description of Processing of First Control Unit of Smartphone Using Specific Example Each of FIG. 6 to FIG. 8 is a diagram illustrating a specific example of processing of the second control unit 310.

2-1. Description of Processing of First Determination Unit

Figure 6:
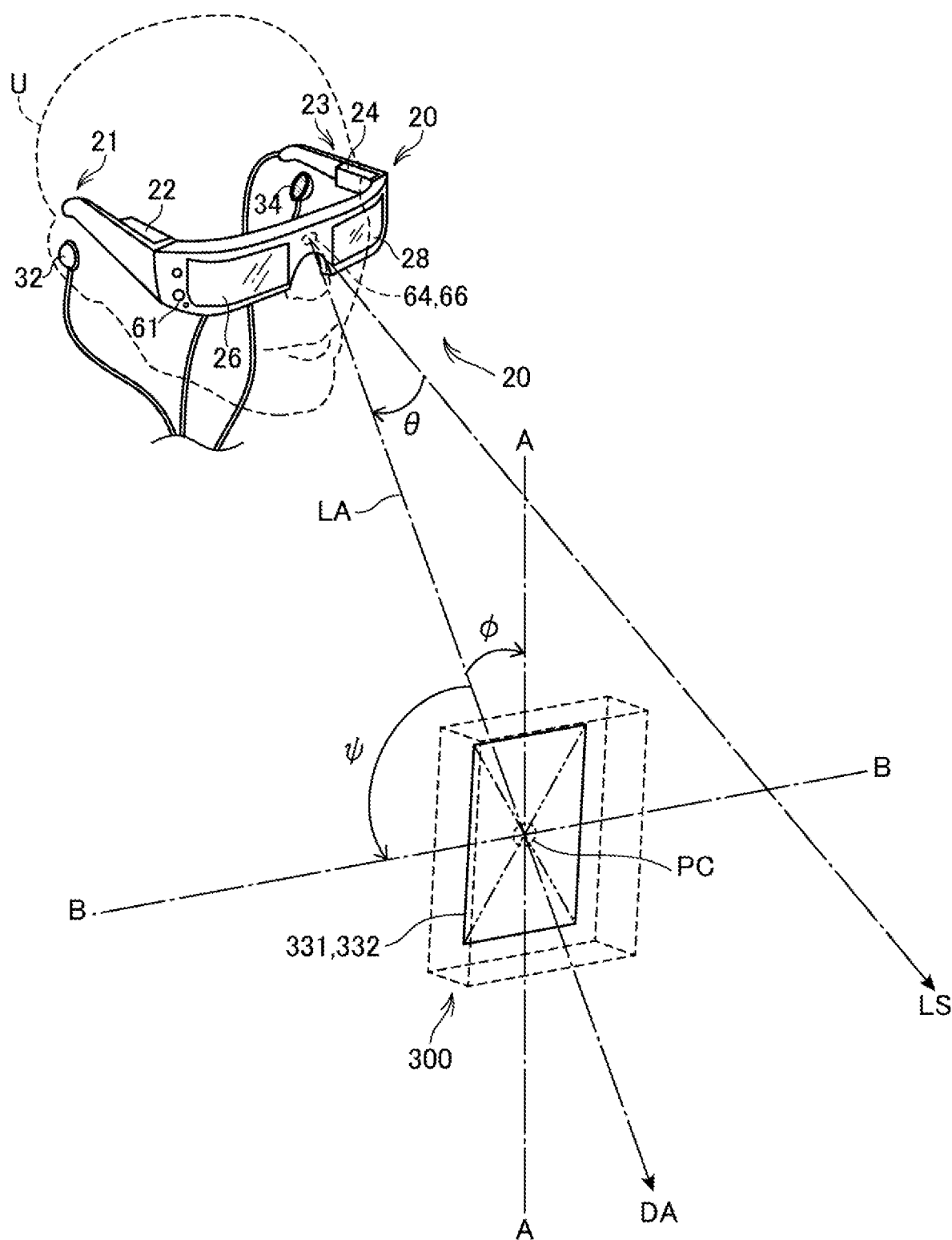
FIG. 6 is a diagram illustrating an example of a state in which a display panel is facing the HMD.

FIG. 6 is a diagram illustrating an example of a state in which the display panel 331 is facing the HMD 100. As illustrated in FIG. 6, when the user manipulates the smartphone 300, the smartphone 300 is typically arranged in a direction LS of the line-of-sight of the user. The direction LS indicates the line-of-sight direction of the user. The direction LS is detected by the line-of-sight detection unit 123 based on the image captured by the inner camera 68.

A direction DA indicates a direction from the HMD 100 towards a central position PC of the touch sensor 332 of the smartphone 300. The direction DA is detected by the first determination unit 313 based on the external scene image captured by the camera 61.

The direction DA is inclined by an inclination angle $\theta$ with respect to the direction LS. The inclination angle $\theta$ indicates an inclination angle of the direction DA with respect to the direction LS.

When the absolute value of the inclination angle $\theta$ is not greater than a threshold angle $\theta S$, the first determination unit 313 determines that the display panel 331 is positioned within the field of view of the user. That is, when the inclination angle $\theta$ is not greater the threshold angle $\theta S$, the first determination unit 313 determines that the first condition is satisfied. The threshold angle $\theta S$ is, for example, 70 degrees.

A line A-A indicates the long-side direction of the touch sensor 332. A line B-B indicates the short-side direction of the touch sensor 332.

The line A-A is inclined with respect to the direction DA by an inclination angle $\varphi$. The inclination angle $\varphi$ indicates an inclination angle of the line A-A with respect to the direction DA. Additionally, the line B-B is inclined with respect to the direction DA by the inclination angle $\psi$. The inclination angle $\psi$ indicates an inclination angle of the B-B line with respect to direction DA. The inclination angle $\varphi$ and the inclination angle $\psi$ are detected by the first determination unit 313 based on the external scene image captured by the camera 61.

When the user manipulates the touch sensor 332, the direction LS is estimated to match the direction DA. That is, when the user manipulates the touch sensor 332, the inclination angle $\varphi$ and the inclination $\psi$ define the inclination of the display surface of the display panel 331 with respect to the user or the HMD 100.

For example, when each of the inclination angle $\psi$ and the inclination angle $\psi$ is 90 degrees, the display surface of the display panel 331 is orthogonal to the direction DA.

Therefore, when the inclination angle $\psi$ is not less than the minimum inclination angle $\varphi N$ and is not greater than the maximum inclination angle $\varphi X$, and the inclination angle $\psi$ is not less than the minimum inclination angle $\psi N$ and is not greater than the maximum inclination angle $\psi X$, the first determination unit 313 determines that the HMD 100 is positioned in the normal direction of the display surface of the display panel 331. That is, the first determination unit 313 determines that the second condition is satisfied. Each of the minimum inclination angle $\varphi N$ and the minimum inclination angle $\psi N$ is, for example, 60 degrees, and each of the maximum inclination angle $\varphi X$ and the maximum inclination angle $\psi X$ is, for example, 120 degrees.

In this way, the first determination unit 313 can determine whether the first condition is satisfied and whether the second condition is satisfied, based on the external scene image captured by the camera 61 and the image captured by the inner camera(s) 68. Therefore, the first determination unit 313 can determine whether the first condition is satisfied, based on the external scene image captured by the camera 61 and the image captured by the inner camera(s) 68.

A distance LA indicates the distance between the display panel 331 and the HMD 100. The distance LA is detected by the distance sensor 64. When the distance LA is not less than the threshold distance LS, the first determination unit 313 determines that the third condition is satisfied. The threshold distance LS is, for example, 0.8 m.

In this way, the first determination unit 313 can determine whether the second condition is satisfied based on the detection result of the distance sensor 64.

Figure 7:
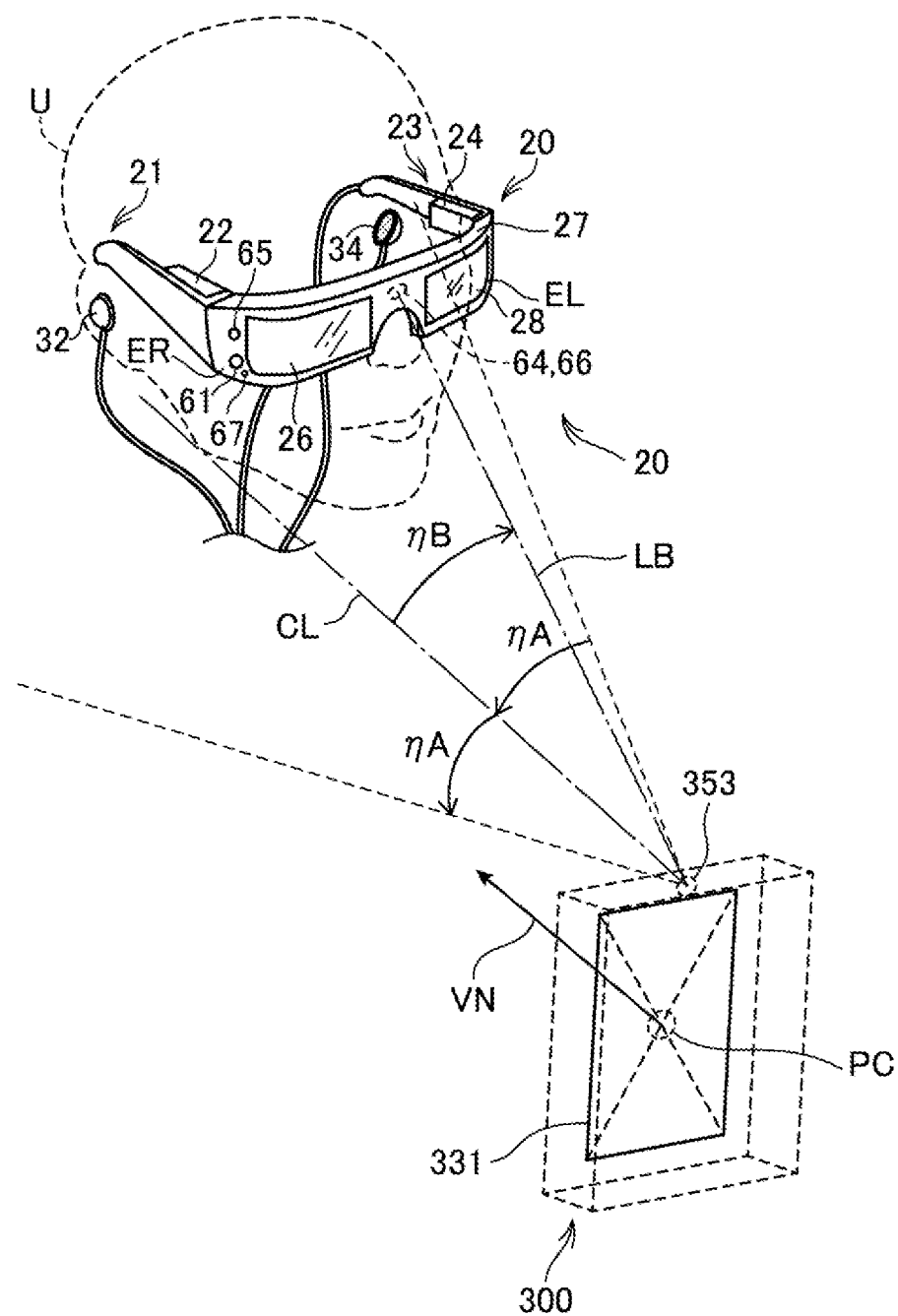
FIG. 7 is a diagram illustrating another example of a state in which the display panel is facing the HMD.

FIG. 7 is a diagram illustrating another example of a state in which the display panel 331 is facing the HMD 100.

As illustrated in FIG. 7, the infrared ray is emitted from the infrared communication unit 353 in a direction indicated by a center line CL. The centerline CL is parallel to a vector VN. The vector VN indicates the normal vector of the display surface of the display panel 331. That is, the center line CL is orthogonal to the plane including the display surface of the display panel 331.

A range that is not great than an inclination angle $\eta A$ with respect to the center line CL indicates a range where the infrared ray emitted from the infrared communication unit 353 reaches. In other words, the inclination angle $\eta A$ indicates a spread angle of the infrared ray emitted from the infrared communication unit 353.

A straight line LB indicates a straight line that connects the infrared sensor 66 and the infrared communication unit 353. An inclination angle $\eta B$ indicates an inclination angle of the straight line LB with respect to the center line CL. As illustrated in FIG. 7, the inclination angle $\eta B$ is less than the inclination angle $\eta A$. Therefore, the infrared sensor 66 receives the infrared ray emitted from the infrared communication unit 353.

When the infrared sensor 66 receives the infrared ray emitted from the infrared communication unit 353, the first determination unit 313 determines that HMD 100 is positioned in the normal line direction of the display surface of the display panel 331. That is, the first determination unit 313 determines that the second condition is satisfied.

In this way, the first determination unit 313 can determine whether the second condition is satisfied based on the detection result of the infrared sensor 66.

2-2. Description of Processing of Adjustment Unit

Figure 8:
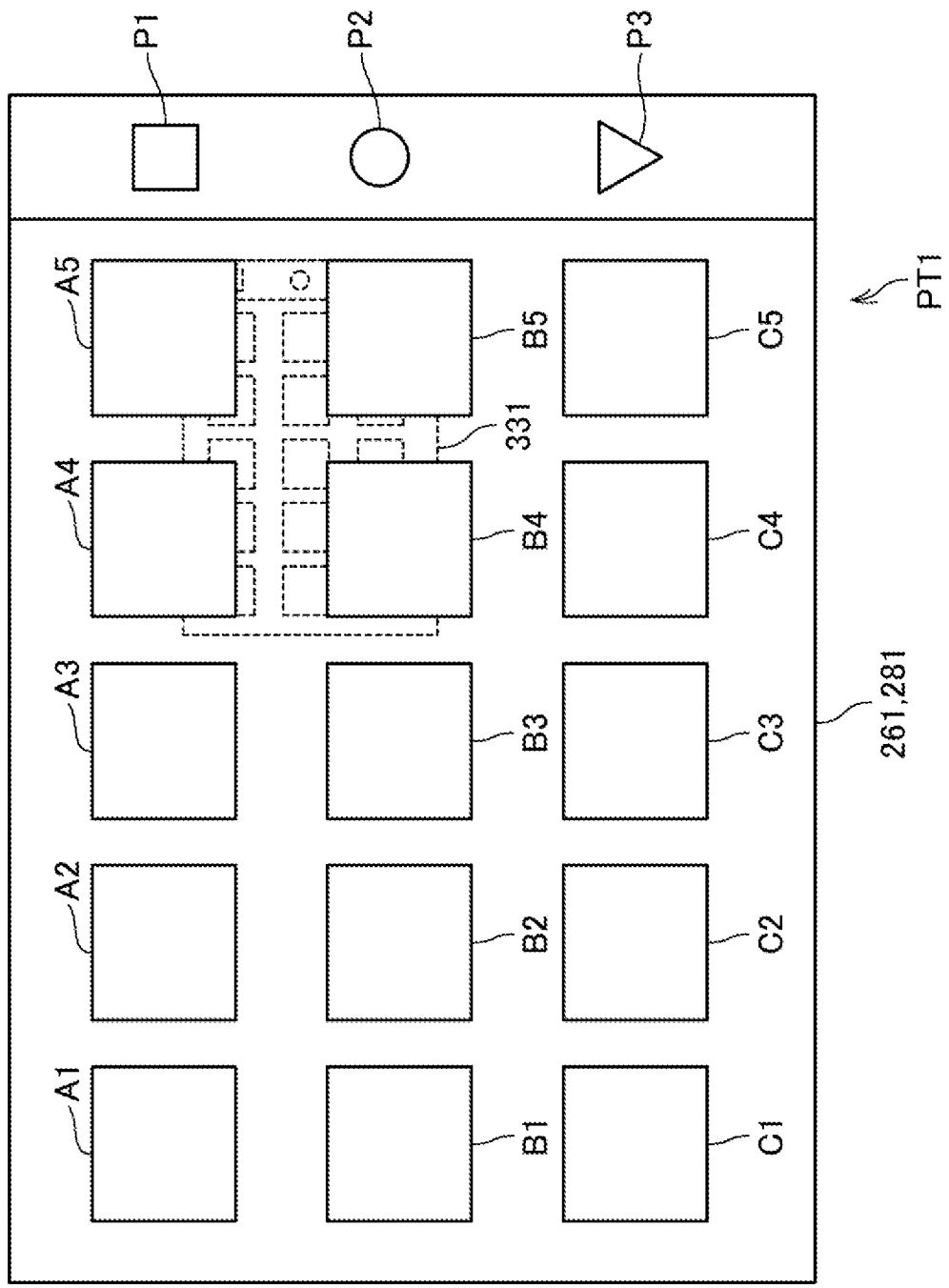
FIG. 8 is a screen view illustrating an example of a state in which the position of the display panel is included in the first image.

FIG. 8 is a screen view illustrating an example of a state in which the position of the display panel 331 is included in the first image PT1.

As illustrated in FIG. 8, the first image PT1 is displayed on each of the half mirror 261 and the half mirror 281. The first image PT1 includes icons A1 to A5, icons B1 to B5, icons C1 to C5, and buttons P1 to P3. Note that, the first image PT1 does not include a back image. That is, in each of the half mirror 261 and the half mirror 281, the user can visually recognize the external scene in a region other than the icons A1 to A5, the icons B1 to B5, the icons C1 to C5, and the buttons P1 to P3. The first image PT1 includes the position of the display panel 331 with respect to the HMD 100. Specifically, in each of the half mirror 261 and the half mirror 281, the positions of the icon A4, icon A5, icon B4, and icon B5 coincide with the positions of the display panel 331.

Therefore, a part of the display panel 331 is obstructed and hidden by the icons A4, A5, B4 and B5. In this case, the user may have difficulty viewing the second image PT2 displayed on the display panel 331.

Figure 9:
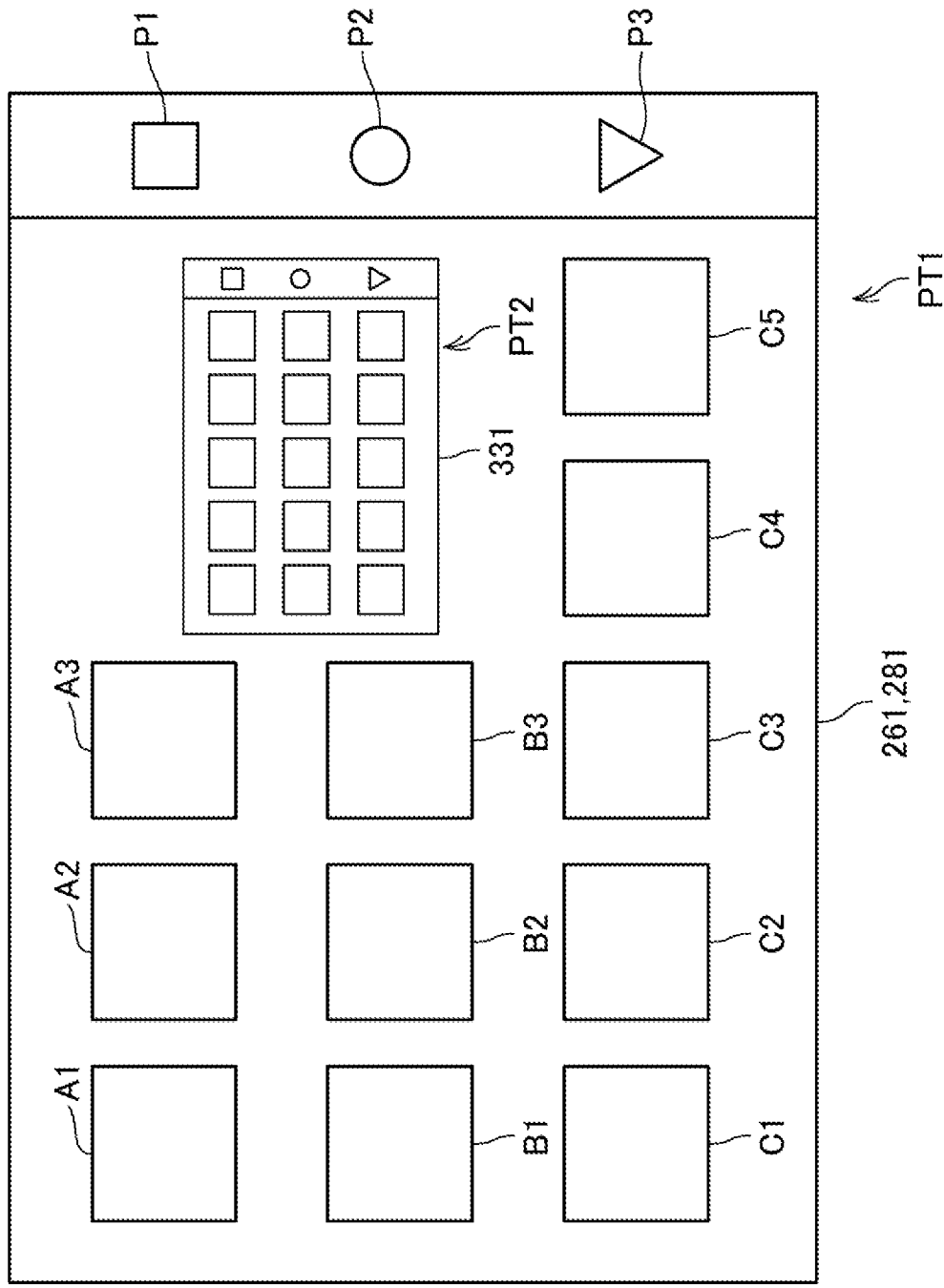
FIG. 9 is a screen view illustrating an example of a state in which an image of a part of a first image is hidden.

FIG. 9 is a screen view illustrating an example of a state in which image of a part of the first image PT1 is hidden. As illustrated in FIG. 9, the adjustment unit 316 hides an image of a part of the first image PT1 such that the position of the display panel 331 is not included in the first image PT1. Specifically, the adjustment unit 316 hides each of the icons A4, A5, B4, and B5.

In this way, by hiding each of the icons A4, A5, B4, and B5 in positions that obstruct the display panel 331, the positions of display panel 331 can be prevented from being included in first image PT1. Therefore, the user can easily visually recognize the second image PT2 displayed on the display panel 331. As a result, the user can easily manipulates the touch sensor 332.

In FIG. 9, a case where the adjustment unit 316 hides a part of the first image PT1 is described, the adjustment unit 316 may reduce the density of a part of the first image PT1. Specifically, the adjustment unit 316 may reduce the density of the images corresponding to the positions of the display panel 331 in the first image PT1. More specifically, the adjustment unit 316 may reduce the density of each of the icon A4, A5, B4, and B5.

In this case, the density of each of the icons A4, A5, B4, and B5 is reduced, thus the user can easily visually recognize the second image PT2 displayed on the display panel 331.

Furthermore, the adjustment unit 316 may execute a process of making images of a part of the first image PT1 translucent. Specifically, the adjustment unit 316 may execute the process of making the images corresponding to the positions of the display panel 331 in the first image PT1 translucent. More specifically, the adjustment unit 316 may execute the process of making each of the icons A4, A5, B4, and B5 translucent.

In this case, each of the icons A4, A5, B4, and B5 is made translucent, thus the user can easily visually recognize the second image PT2 displayed on the display panel 331.

Figure 10:
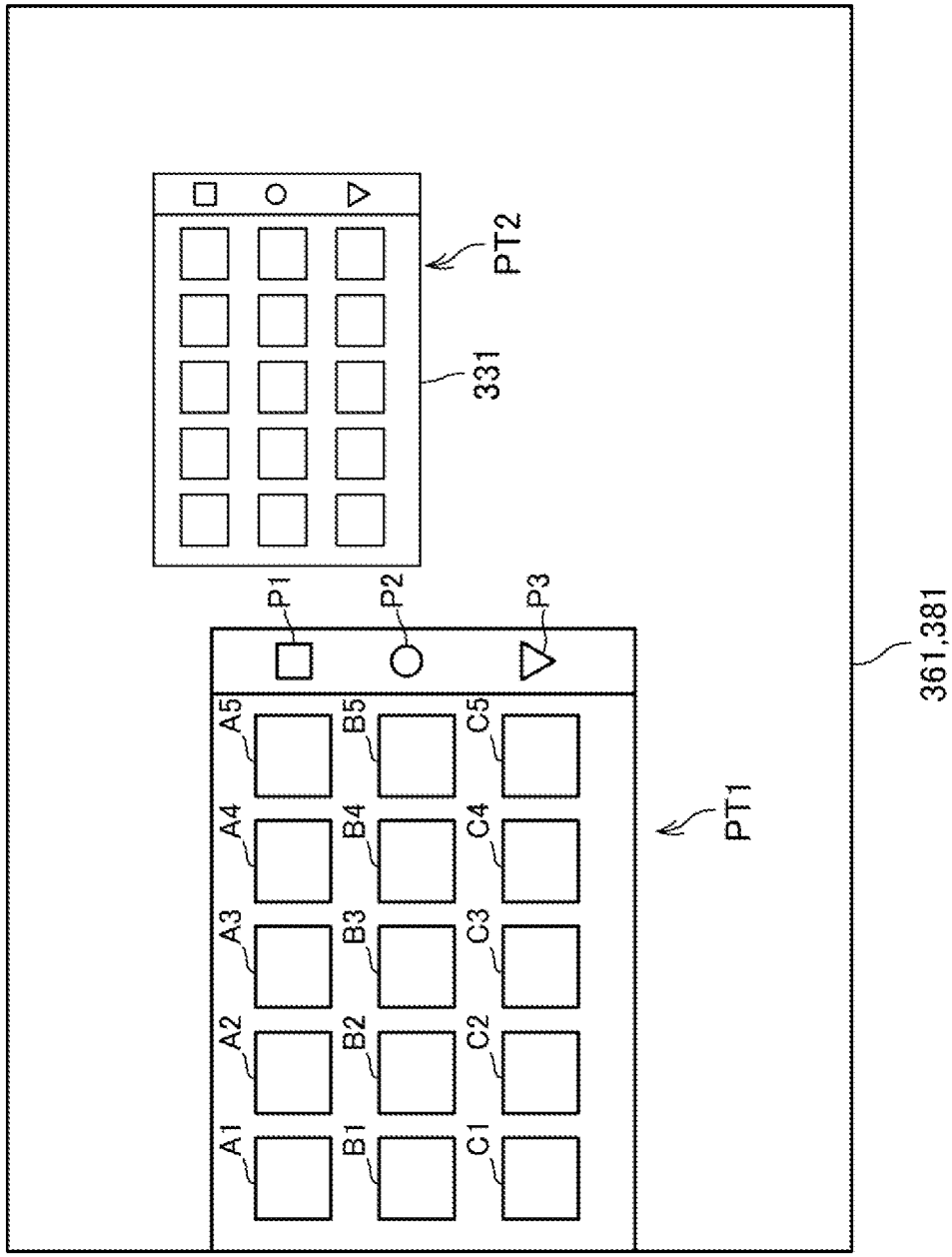
FIG. 10 is a screen view illustrating an example of a state in which the first image is reduced and moved.

FIG. 10 is a screen view illustrating an example of a state in which the first image PT1 is reduced and moved.

As illustrated in FIG. 10, the adjustment unit 316 reduces and moves the first image PT1 such that the position of the display panel 331 is not included in the first image PT1. Specifically, the adjustment unit 316 reduces the first image PT1 to 50%, and moves the first image PT1 to a position in contact with the left side of each of the half mirror 261 and the half mirror 281.

In this way, by downscaling and moving the first image PT1, the position of the display panel 331 can be prevented from being included in the first image PT1. Therefore, the user can easily visually recognize the second image PT2 displayed on the display panel 331. As a result, the user can easily manipulates the touch sensor 332. In addition, in this case, the user can easily visually recognize the first image PT1, thus the user can easily manipulates the touch sensor 332.

In FIG. 10, a case where the adjustment unit 316 reduces and moves the first image PT1 is described, but the adjustment unit 316 may reduce or move the first image PT1 such that the position of the display panel 331 is not included in the first PT1.

In this case, the processing of the adjustment unit 316 can be simplified. Therefore, the load on the second control unit 310 can be reduced.

3. Description of Processing of Second Control Unit of Smartphone

Figure 11:
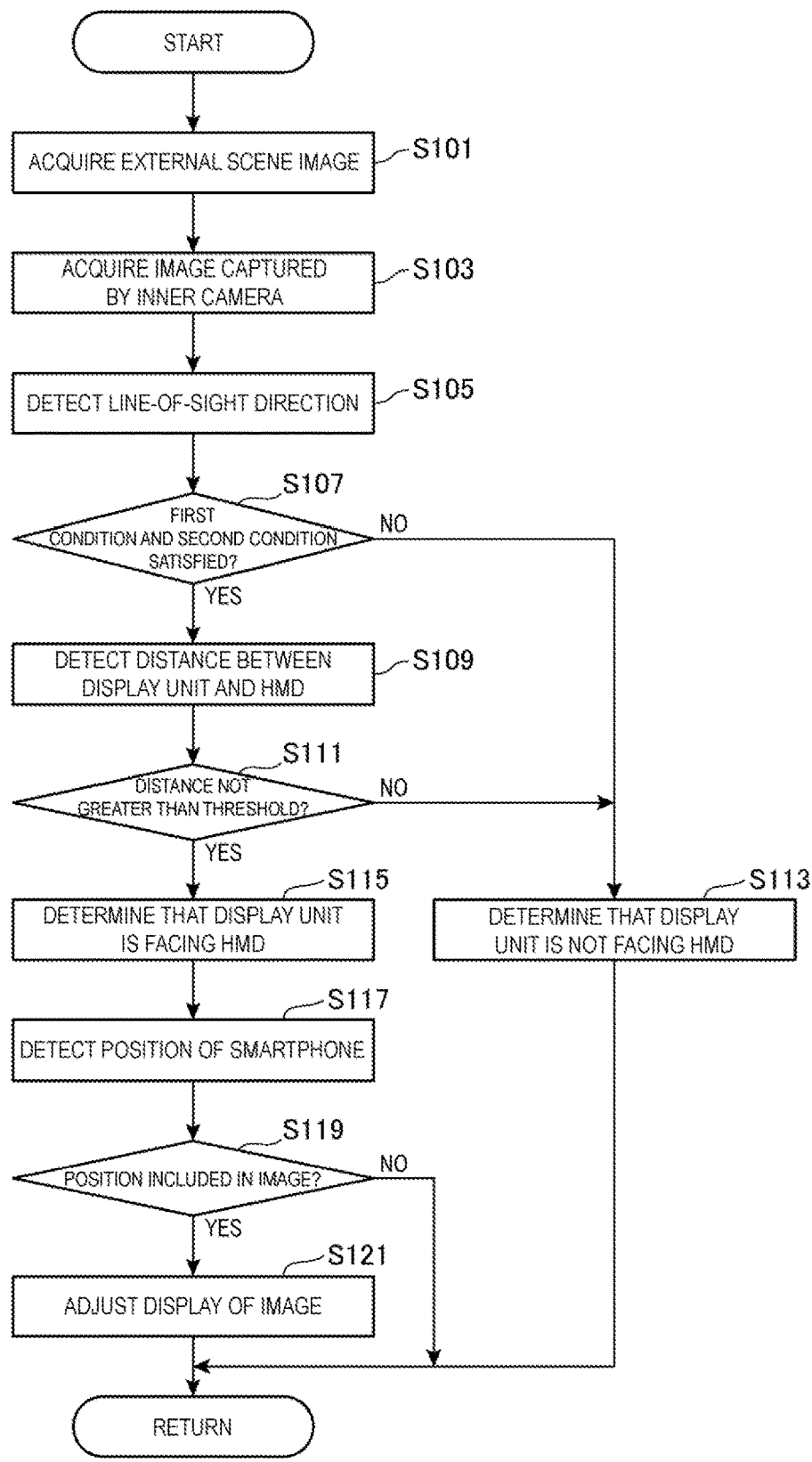
FIG. 11 is a flowchart illustrating operations of a first control unit and a second control unit.

FIG. 11 is a flowchart illustrating the processing of the first control unit 120 of the HMD 100 and the second control unit 310 of the smartphone 300.

First, as illustrated in FIG. 11, in step S101, the second control unit 310 acquires the external scene image data captured by the camera 61.

Next, in step S103, the line-of-sight detection unit 123 of the first control unit 120 acquires the captured image data of the inner camera(s) 68.

Next, in step S105, the line-of-sight detection unit 123 of the first control unit 120 detects the line-of-sight direction of the user based on the captured image data of the inner camera(s) 68.

Next, in step S107, the first determination unit 313 of the second control unit 310 determines whether the first condition and the second condition are satisfied. Specifically, when the display panel 331 is positioned within the field of view of the user and the HMD 100 is positioned in the normal direction of the display surface of the display panel 331, the first determination unit 313 determines that the first condition and the second condition are satisfied.

More specifically, the first determination unit 313 determines whether the display panel 331 is positioned within the field of view of the user, based on the external scene image formed by the camera 61 and the line-of-sight direction detected by the line-of-sight detection unit 123. Further, the first determination unit 313 determines whether the display panel 331 is facing the HMD 100 based on the detection result of the infrared sensor 66. If the first determination unit 313 determines that the first condition or the second condition is not satisfied (step S107: NO), processing proceeds to step S113.

Then, in step S113, the first determination unit 313 determines that the display panel 331 is not facing the HMD 100. The process then returns to step S101.

If the first determination unit 313 determines that the first condition and the second condition are satisfied (step S107: YES), processing proceeds to step S109.

Then, in step S109, the first determination unit 313 acquires the distance LA between the display panels 331 and the HMD 100 according to the distance sensor 64.

Next, in step S111, the first determination unit 313 determines whether the distance LA is not greater than the threshold distance LS.

If the first determination unit 313 determines that the distance LA is greater than the threshold distance LS (step S111: NO), then in step S113, the first determination unit 313 determines that the display panel 331 is not facing the HMD 100. The process then returns to step S101.

If the first determination unit 313 determines that the distance LA is not greater than the threshold distance LS (step S111: YES), processing proceeds to step S115.

Then, in step S115, the first determination unit 313 determines that the display panel 331 is facing the HMD 100.

Next, in step S117, the detection unit 314 detects the position of the display panel 331 of the smartphone 300 with respect to the HMD 100.

Next, in step S119, the second determination unit 315 determines whether the position of the display panel 331 of the smartphone 300 with respect to the HMD 100 is included in the first image PT1 visually recognized by the image display unit 20.

If the second determination unit 315 determines that the position of the display panel 331 is not included in the first image PT1 (step S119: NO), processing returns to step S101. If the second determination unit 315 determines that the position of the display panel 331 is included in the first image PT1 (step S119: YES), processing proceeds to step S121.

Then, in step S121, the adjustment unit 316 adjusts the display of the first image PT1 on the image display unit 20. Specifically, the adjustment unit 316 adjusts the display of the first image PT1 such that the position of the display panel 331 is not included in the first image PT1. The process then returns to step S101.

Note that, step S107 and step S111 in FIG. 10 correspond to examples of "first determination step". Each of step S113 and step S117 corresponds to an example of "detection step". Step S119 corresponds to an example of "second determination step". Step S121 corresponds to an example of "adjustment step".

4. Effects of Exemplary Embodiment

As described above, in the present exemplary embodiment, the HMD100 includes an image display unit 20 configured to visually recognize an external scene and that display the first image PT1 overlapping the external scene, and a first display control unit 121 configured to display the first image PT1 on the image display unit 20. The smartphone 300 includes a display panel 331 configured to display a second image PT2, a touch sensor 332 that is arranged on the display panel 331 and configured to receive a position input operation to detect coordinates of an operating position, a first determination unit 313 configured to determine whether the display panel 331 is facing the HMD 100, a detection unit 314 configured to detect the position of the display panel 331 with respect to the HMD 100, a second determination unit 315 configured to determine whether the position of the display panel 331 with respect to the HMD 100 is included in the first image PT1 visually recognized by the image display unit 20, an adjustment unit 316 configured to adjust the display of the first image PT1 on the image display unit 20 based on the determination result of the first judging unit 313 and the determination result of the second judging unit 315.

Therefore, for example, when the first determination unit 313 determines that the display panel 331 is facing the HMD 100, and the second determination unit 315 determines that the position of the display panel 331 with respect to the HMD 100 is included in the first image PT1 visually recognized by the image display unit 20, the adjustment unit 316 adjusts the display of the first image PT1 on the image display unit 20. Therefore, by adjusting the display of the first image PT1 on the image display unit 20, the visibility of the second image PT2 displayed on the display panel 331 can be improved. As a result, the operability of the touch sensor 332 by the user can be improved.

The HMD 100 further includes a camera 61 configured to capture the external scene, and the first determination unit 313 determines whether the display panel 331 of the smartphone 300 is facing the HMD 100 based on the image captured by the camera 61.

Therefore, the first determination unit 313 can accurately determine whether the display panel 331 of the smartphone 300 is facing the HMD 100.

Additionally, the HMD 100 further includes a line-of-sight detection unit 123 configured to detect the line-of-sight direction of the user, and the first determination unit 313 determines whether the display panel 331 of the smartphone 300 is facing the HMD 100 based on the detection result of the line-of-sight detection unit 123.

Therefore, the first determination unit 313 can accurately determine whether the display panel 331 of the smartphone 300 is facing the HMD 100.

The smartphone 300 further includes an infrared communication unit 353 configured to emit infrared ray, and the HMD 100 further includes an infrared sensor 66 configured to receive the infrared ray, and the first determination unit 313 determines whether the display panel 331 of the smartphone 300 is facing the HMD 100 based on the detection result of the infrared sensor 66.

Therefore, the first determination unit 313 can accurately determine whether the display panel 331 of the smartphone 300 is facing the HMD 100.

Further, the infrared communication unit 353 is configured to emit infrared ray in the normal direction of the display surface of the display panel 331.

Therefore, the first determination unit 313 can accurately determine whether the display panel 331 of the smartphone 300 is facing the HMD 100.

Additionally, the HMD 100 further includes a distance sensor 64 configured to detect a distance, and the first determination unit 313 determines whether the display panel 331 is facing the HMD 100 based on the distance LA between the HMD 100 and the display panel 331 detected by the distance sensor 64.

When the distance LA is greater than the threshold distance LS, the first determination unit 313 determines that the display panel 331 is not facing the HMD 100. Therefore, by appropriately setting the value of the threshold distance LS, it is possible to accurately determine whether the display panel 331 is facing the HMD 100.

Further, when the first determination unit 313 determines that the display panel 331 is facing the HMD 100, and the second determination unit 315 determines that the position of the display panel 331 with respect to the HMD 100 is included in the first image PT1 visually recognized by the image display unit 20, the adjustment unit 316 adjusts the display of the first image PT1 in the image display unit 20.

Therefore, by adjusting the display of the first image PT1 in the image display unit 20, the visibility of the second image PT2 displayed on the display panel 331 can be improved. Thus, the operability of the touch sensor 332 by the user can be improved.

Further, the adjustment unit 316 reduces the density of the images corresponding to the positions of the display panel 331 in the first image PT1 on the image display unit 20.

Therefore, the visibility of the second image PT2 displayed on the display panel 331 can be improved. Thus, the operability of the touch sensor 332 by the user can be improved.

Further, the adjustment unit 316 adjusts the display of the first image PT1 in the image display unit 20 such that the position of the display panel 331 is not included in the first image PT1.

Therefore, the position of the display panel 331 is not included in the first image PT1, thus the visibility of the second image PT2 displayed on the display panel 331 can be improved. Thus, the operability of the touch sensor 332 by the user can be improved.

In addition, the adjustment unit 316 hides images of at least a part of the first image PT1 on the image display unit 20 such that the position of the display panel 331 is not included in the first image PT1.

For example, the adjustment unit 316 hides the images corresponding to the positions of the display panel 331 of the first image PT1. Thus, the visibility of the second image PT2 displayed on the display panel 331 can be improved with a simple process.

Further, the adjustment unit 316 moves the display position of the first image PT1 in the image display unit 20 such that the position of the display panel 331 is not included in the first image PT1.

Thus, the visibility of the second image PT2 displayed on the display panel 331 can be improved with a simple process.

Further, the adjustment unit 316 reduces and displays the first image PT1 on the image display unit 20 such that the position of the display panel 331 is not included in the first image PT1.

Thus, the visibility of the second image PT2 displayed on the display panel 331 can be improved with a simple process.

5. Other Exemplary Embodiments

The present disclosure is not limited to the configurations in the exemplary embodiment described above, and can be implemented in various aspects without departing from the gist of the disclosure.

For example, in the exemplary embodiment described above, an "information processor" is, but is not limited to, the smartphone 300. The "information processor" is configured to be portable by a user and may be include a display unit, a position input unit, and a control unit. For example, the "information processor" may be a PDA terminal or a tablet personal computer.

Further, in the exemplary embodiment described above, the first determination unit 313 determines whether the display panel 331 of the smartphone 300 is facing the HMD 100 based on the external scene image captured by the camera 61, the image captured by the inner camera(s) 68, and the detection result of the infrared sensor 66, but the present disclosure is not limited to this. The first determination unit 313 may determine whether the display panel 331 of the smartphone 300 is facing the HMD 100 based on at least one of the external scene image captured by the camera 61, the image captured by the inner camera 68, and the detection result of the infrared sensor 66.

Further, in the exemplary embodiment described above, when the display panel 331 is positioned within the field of view of the user, the HMD 100 is positioned in the normal direction of the display surface of the display panel 331, and the distance LA between the HMD 100 and the display panel 331 is not greater than the threshold distance LS, the first determination unit 313 determines that the display panel 331 is facing the HMD 100, but the present disclosure is not limited to this. The first determination unit 313 may determine whether the display panel 331 is facing the HMD 100 based on at least one of whether the display panel 331 is positioned within the field of view of the user, whether the HMD 100 is positioned in the normal direction of the display surface of the display panel 331, and whether the distance LA between the HMD 100 and the display panel 331 is not greater than the threshold distance LS.

Further, in the exemplary embodiment described above, the configuration in which the connection device 10 is connected to the image display unit 20 by wire is illustrated, however, the present disclosure is not limited to this, and the image display unit 20 may be configured to be connected wirelessly to the connection device 10.

Further, a part of the functions of the connection device 10 may be provided in the image display unit 20, the connection device 10 may be realized by a plurality of devices. For example, instead of the connection device 10, a wearable device that can be mounted to the body or clothes of the user, or to the personal adornments worn by the user may be used. The wearable device in such a case may be, for example, a watch-like device, a ring-like device, a laser pointer, a mouse, an air mouse, a game controller, a pen-like device, or the like.

In addition, in the exemplary embodiment described above, the configuration in which the image display unit 20 and the connection device 10 are separated, and are connected via the connection cable 40 has been illustrated as an example. The present disclosure is not limited to this, and a configuration mounted on a head of the user in which the connection device 10 and the image display unit 20 are integrally formed may also be used.

Further, in the exemplary embodiment described above, the configuration in which the user views an external scene through a display unit is not limited to a configuration where the right light-guiding plate 26 and the left light-guiding plate 28 transmit outside light. For example, the present disclosure is applicable to a display device configured to display an image in a state where an external scene cannot be visually recognized. Specifically, the present disclosure can be applied to a display apparatus configured to display images captured by the camera 61, images and CG generated based on the captured images, and movies based on the movie data stored beforehand, or the movie data input from outside. This kind of display device can include a so-called closed type display device in which an external scene cannot be visually recognized. For example, with a configuration in which composite images created by combining together images of an external scene captured by the camera 61, and display images are displayed by the image display unit 20, even if the image display unit 20 may not transmit outside light, the external scene and images can be displayed such that the user can visually recognize. Of course, it is also possible to apply the present disclosure to such a so-called video see-through display apparatus.

Additionally, instead of the image display unit 20, for example, an image display unit of another type such as an image display unit worn as a hat may be adopted, as long as the image display unit includes a display unit configured to display an image in correspondence to the left eye of a user, and a display unit configured to display an image in correspondence to the right eye of the user. Additionally, the display device may be configured, for example, as an HMD mounted on a vehicle such as a car and an airplane. Further, the display device may be configured, for example, as an HMD built into a body protector tool such as a helmet. In this case, a positioning portion to be positioned on a body of the user, and a portion to be positioned to the positioning portion may be regarded as a mounting portion.

A configuration in which a virtual image was formed by the half mirrors 261 and 281 on a part of the right light-guiding plate 26 and the left light-guiding plate 28 was illustrated as an optical system configured to guide imaging light to the eyes of the user. The present disclosure is not limited to this, and an image may be displayed either on the entire surface of the right light-guiding plate 26 and the left light-guiding plate 28, or in a display region having an area that occupies most part of the right light-guiding plate 26 and the left light-guiding plate 28. In such a case, a process for downscaling the image may be included in an operation for changing the display position of the image.

In addition, the optical elements are not limited to the right light-guiding plate 26 and the left light-guiding plate 28 having half mirrors 261 and 281, and any optical components that allow the imaging light to enter the eyes of the user, specifically, diffraction grating, prisms, and holographic display units may be employed.

In addition, such a configuration may be adopted that at least some of the function blocks illustrated in FIG. 4 and FIG. 5 and the like are achieved with hardware, or achieved together with hardware and software, and the present disclosure is not limited to a configuration in which independent hardware resources are arranged as illustrated in the figures.

Further, the control program executed by the second control unit 310 may be stored in the non-volatile storage unit 123 or another storage unit (not illustrated) in the second control unit 310. Further, a configuration may be adopted that programs stored in external devices may be acquired via the communication unit 345 and the like to be executed.

Further, a duplicate of a configuration formed in the connection device 10 may be formed in the image display unit 20. For example, a processor similar to the processor of the connection device 10 may be arranged in the image display unit 20, or the processor of the connection device 10 and the processor of the image display unit 20 may be configured to separately perform functions.

For example, processing units in the flowchart illustrated in FIG. 11 are divided according to the main processing contents in order to facilitate the understanding of the processing in the first control unit 120 of the HMD 100, and the second control unit 310 of the smartphone 300. The exemplary embodiment is not limited by the way or the name dividing the processing units illustrated in the flowchart in FIG. 11. The processing of the second control unit 310 can be divided into more processing units in accordance with a processing content, and can be divided such that one processing unit includes more processing. An order of the processing in the above-described flowchart is also not limited to the illustrated example.

Further, the processing of the second control unit 310 may be executed by the first control unit 120, or the processing of the first control unit 120 may be executed by the second control unit 310.

Further, the control method of the smartphone 300 can be realized by causing the computer included in the smartphone 300 to execute the control program corresponding to the control method of the smartphone 300. Furthermore, the control program can also be recorded in a recording medium so as to be readable by a computer. The recording medium can be a magnetic recording medium, an optical recording medium, or a semiconductor memory device. Specifically, a portable or stationary type recording medium, such as a flexible disk, a Compact Disk Read Only Memory (CD-ROM), a Digital Versatile Disk (DVD), a Blu-ray (registered trademark) disc, a magneto-optical disc, a flash memory, a card type recording medium, or the like may be exemplified. The recording medium may be non-volatile storage devices such as a RAM, a ROM, and a HDD, all representing internal storages included in an image display apparatus. Further, the control program corresponding to the control method of the smartphone 300 is stored in a server apparatus or the like, and thus the control method of the smartphone 300 can be realized by downloading the control program from the server apparatus to the smartphone 300.

What is claimed is:

1. A display system comprising:
a display device mounted on a head of a user; and
an information processor to which the display device is coupled, wherein the display device includes:
  a first display unit configured to visually recognize an external scene and display a first image overlapping the external scene; and
  a first processor configured to display the first image on the first display unit,
the information processor includes:
  a second display unit configured to display a second image;
  a position sensor arranged at the second display unit, and configured to receive a position input operation to detect coordinates of an operating position; and
  a second processor configured to:
    determine whether the second display unit is facing the display device;
    detect a position of the second display unit with respect to the display device;
    determine whether the position of the second display unit with respect to the display device is included in the first image visually recognized by the first display unit; and
    adjust display of the first image on the first display unit by always removing a part of the first image that overlaps the second image such that the second image is spaced from the first image based on a determination result of whether the second display unit is facing the display device and a determination result of whether the position of the second display unit with respect to the display device is included in the first image visually recognized by the first display unit;
    acquire a distance between the second display unit and the display device;
    determine that the second display unit is not facing the display device when:
      the second processor determines that the distance is greater than a threshold distance, and the second display unit is positioned within a field of view of the user and the display device is positioned in a normal direction of a display surface of the second display unit; and
    determine that the second display unit is not facing the display device when the second display unit is either not positioned within the field of view of the user or the display device is not positioned in the normal direction of the display surface of the second display unit.

2. The display system according to claim 1, wherein
the display device includes a camera configured to capture the external scene, and
the second processor is configured to determine, based on an image captured by the camera, whether the second display unit of the information processor is facing the display device.

3. The display system according to claim 1, wherein
the first processor configured to detect a line-of-sight direction of the user, and
the second processor is configured to determine, based on a detection result of the first processor regarding detection of the line-of-sight direction of the user, whether the second display unit of the information processor is facing the display device.

4. The display system according to claim 1, wherein
the information processor includes an infrared ray emitter configured to emit an infrared ray,
the display device includes an infrared ray receiver configured to receive the infrared ray, and
the second processor is configured to determine, based on a receiving result of the infrared ray receiver, whether the second display unit of the information processor is facing the display device.

5. The display system according to claim 4, wherein
the infrared emitter emits the infrared ray in a normal direction of a display surface of the second display unit.

6. The display system according to claim 1, wherein
the display device includes a distance sensor configured to detect a distance, and
the second processor is configured to determine, based on a distance between the display device and the second display unit detected by the distance sensor, whether the second display unit is facing the display device.

7. The display system according to claim 1, wherein
the second processor is configured to adjust the display of the first image on the first display unit when the second processor determines that the second display unit is facing the display device, and the second processor determines that the position of the second display unit with respect to the display device is included in the first image visually recognized by the first display unit.

8. The display system according to claim 7, wherein
the second processor is configured to reduce a density of an image corresponding to a position of the second display unit in the first image on the first display unit.

9. The display system according to claim 7, wherein
the second processor is configured to adjust the display of the first image on the first display unit such that the position of the second display unit is not included in the first image.

10. The display system according to claim 9, wherein
the second processor is configured to hide at least a part of the first image on the first display unit such that the position of the second display unit is not included in the first image.

11. The display system according to claim 9, wherein
the second processor is configured to move a display position of the first image on the first display unit such that the position of the second display unit is not included in the first image.

12. The display system according to claim 9, wherein
the second processor is configured to reduce and display the first image such that the position of the second display unit is not included in the first image.

13. The display system of claim 1, wherein
the second processor is configured to:
display the second image on the second display unit; and
transmit data indicating the first image to the display device, and
the second image matches the first image.

14. A non-transitory computer-readable storage medium storing a control program for an information processor, the information processor, to which a display device mounted on a head of a user including a first display unit configured to visually recognize an external scene and display a first image overlapping the external scene is coupled, including a second display unit configured to display a second image, a position sensor arranged at the second display unit, and a computer, wherein
the control program causes the computer to function as a processor configured to:
determine whether the second display unit is facing the display device;
detect a position of the second display unit of the information processor with respect to the display device;
determine whether the position of the second display unit with respect to the display device is included in the first image displayed on the first display unit;
adjust display of the first image on the first display unit by always removing a part of the first image that overlaps the second image such that the second image is spaced from the first image, based on a determination result of whether the second display unit is facing the display device and a determination result of whether the position of the second display unit with respect to the display device is included in the first image displayed on the first display unit;
acquire a distance between the second display unit and the display device;
determine that the second display unit is not facing the display device when:
the second processor determines that the distance is greater than a threshold distance, and
the second display unit is positioned within a field of view of the user and the display device is positioned in a normal direction of a display surface of the second display unit; and
determine that the second display unit is not facing the display device when the second display unit is either not positioned within the field of view of the user or the display device is not positioned in the normal direction of the display surface of the second display unit.

15. A control method for an information processor, to which a display device mounted on a head of a user including a first display unit configured to visually recognize an external scene and display a first image overlapping the external scene is coupled, including a second display unit configured to display a second image, a position sensor arranged at the second display unit, and a computer, wherein
the control method comprises:
a first determination step for determining whether the second display unit is facing the display device;
a detection step for detecting a position of the second display unit of the information processor with respect to the display device;
a second determination step for determining whether the position of the second display unit with respect to the display device is included in the first image displayed on the first display unit;
an adjustment step for adjusting display of the first image on the first display unit by always removing a part of the first image that overlaps the second image such that the second image is spaced from the first image, based on a determination result of the first determination step and a determination result of the second determination step;
an acquiring step for acquiring a distance between the second display unit and the display device;
a third determination step for determining that the second display unit is not facing the display device when:
the distance is greater than a threshold distance, and
the second display unit is positioned within a field of view of the user and the display device is positioned in a normal direction of a display surface of the second display unit; and a fourth determination step for determining that the second display unit is not facing the display device when the second display unit is either not positioned within the field of view of the user or the display device is not positioned in the normal direction of the display surface of the second display unit.

* * * * *